(12) United States Patent
Kadu et al.

(10) Patent No.: US 12,464,170 B2
(45) Date of Patent: Nov. 4, 2025

(54) TENSOR-PRODUCT B-SPLINE PREDICTION FOR HDR VIDEO IN MOBILE APPLICATIONS

(71) Applicant: Dolby Laboratories Licensing Corporation, San Francisco, CA (US)

(72) Inventors: Harshad Kadu, Santa Clara, CA (US); Guan-Ming Su, Fremont, CA (US); Sheng Qu, San Jose, CA (US); Per Jonas Andreas Klittmark, Mountain View, CA (US); Hariharan Ganapathy Kathirvelu, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 34 days.

(21) Appl. No.: 18/688,315

(22) PCT Filed: Sep. 8, 2022

(86) PCT No.: PCT/US2022/042969
§ 371 (c)(1),
(2) Date: Feb. 29, 2024

(87) PCT Pub. No.: WO2023/039112
PCT Pub. Date: Mar. 16, 2023

(65) Prior Publication Data
US 2025/0133241 A1    Apr. 24, 2025

Related U.S. Application Data

(60) Provisional application No. 63/255,057, filed on Oct. 13, 2021, provisional application No. 63/242,416, filed on Sep. 9, 2021.

(30) Foreign Application Priority Data

Oct. 13, 2021    (EP) ..................................... 21202447

(51) Int. Cl.
*H04N 19/186* (2014.01)
*G06T 5/90* (2024.01)
(Continued)

(52) U.S. Cl.
CPC ............... *H04N 19/98* (2014.11); *G06T 5/90* (2024.01); *H04N 19/186* (2014.11); *H04N 19/46* (2014.11); *G06T 2207/20208* (2013.01)

(58) Field of Classification Search
CPC ...... H04N 19/98; H04N 19/186; H04N 19/46; G06T 5/90; G06T 2207/20208
(Continued)

(56) References Cited

U.S. PATENT DOCUMENTS 8,811,490 B2    8/2014    Su
8,982,963 B2    3/2015    Gish
(Continued)

FOREIGN PATENT DOCUMENTS

EP    3537717 A1    9/2019
JP    2015503873 A    2/2015
(Continued)

OTHER PUBLICATIONS

CTA-861.3-A (2016) (formerly CEA-861.3) "HDR static metadata extensions".
(Continued)

*Primary Examiner* — Albert Kir

(57) ABSTRACT

Tensor-Product B-splines (TPB) have been shown to improve video quality when used to represent reshaping functions to map reshaped standard dynamic range content into high dynamic range (HDR) content; however, TPB prediction is computationally intensive and may not be supported by legacy devices. Methods and systems for backwards-compatible signaling of TPB-related metadata and a fast TPB prediction method are presented to overcome
(Continued)

both of these limitations. Computation overhead for a TPB-based 3D look-up table is reduced by using temporary two-dimensional arrays. A remapping of the most significant bits of a legacy bit-depth parameter allows for backwards compatibility.

11 Claims, 5 Drawing Sheets

(51) Int. Cl.
*H04N 19/46* (2014.01)
*H04N 19/98* (2014.01)

(58) Field of Classification Search
USPC .................................................. 375/240.12
See application file for complete search history.

(56) References Cited

U.S. PATENT DOCUMENTS

| | | |
|---|---|---|
| 9,264,681 B2 | 2/2016 | Gish |
| 11,962,760 B2 | 4/2024 | Su |
| 2018/0098094 A1* | 4/2018 | Wen ..................... H04N 19/136 |
| 2018/0115777 A1* | 4/2018 | Piramanayagam ....... G06T 7/00 |

FOREIGN PATENT DOCUMENTS

| | | |
|---|---|---|
| WO | 2013103522 A1 | 7/2013 |
| WO | 2021067204 A1 | 4/2021 |
| WO | 2021113549 A1 | 6/2021 |
| WO | 2021262599 A1 | 12/2021 |

OTHER PUBLICATIONS

Fahrmeir, L. et al."Regression: Models, Methods and Applications", Springer, 2013.
International Telecommunication Union (ITU-T); Aug. 2021; Series H: Audiovisual and Multimedia Systems Infrastructure of audiovisual services—Coding of moving video; Advanced video coding for generic audiovisual services; ITU-T H.264; 844 pages.
ITU-R BT.2100-2 "Image Parameter Values for High Dynamic Range Television for Use in Production and International Programme Exchange" Jul. 2018.
ITU-T H.265, Series H: Audiovisual and Multimedia Systems, High Efficiency Video Coding, V9, Sep. 2023, 718 pages.
SMPTE "ST 2094-20:2016 Dynamic Metadata for Color Volume Transform—Application #2 Table of Contents", IEEE, Jul. 21, 2016 (Jul. 21, 2016), pp. 1-23.
SMPTE ST 2084:2014 "High Dynamic Range Electro-Optical Transfer Function of Mastering Reference Displays".

* cited by examiner

TENSOR-PRODUCT B-SPLINE PREDICTION FOR HDR VIDEO IN MOBILE APPLICATIONS

CROSS-REFERENCE TO RELATED APPLICATIONS

This application is a U.S. National Stage of International Application No. PCT/US2022/042969, filed Sep. 8, 2022, which claims the benefit of priority from U.S. Provisional patent application 63/242,416, filed on 9 Sep. 2021, U.S. Provisional patent application 63/255,057, filed on 13 Oct. 2021, and EP patent application Ser. No. 21/202,447.5, filed on 13 Oct. 2021, each one incorporated by reference in their entirety.

TECHNOLOGY

The present invention relates generally to images. More particularly, an embodiment of the present invention relates to image prediction for high dynamic range (HDR) imaging in mobile applications.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR.

In practice, images comprise one or more color components (e.g., luma Y and chroma Cb and Cr) wherein each color component is represented by a precision of n-bits per pixel (e.g., n=8). Using linear or gamma luminance coding, images where n≤8 (e.g., color 24-bit JPEG images) are considered images of standard dynamic range, while images where n>8 may be considered images of enhanced or high dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

As used herein, the term "reshaping" or "remapping" denotes a process of sample-to-sample or codeword-to-codeword mapping of a digital image from its original bit depth and original codewords distribution or representation (e.g., gamma, PQ, or HLG and the like) to an image of the same or different bit depth and a different codewords distribution or representation. Reshaping allows for improved compressibility or improved image quality at a fixed bit rate. For example, without limitation, forward reshaping may be applied to 10-bit or 12-bit PQ-coded HDR video to improve coding efficiency in a 10-bit video coding architecture. In a receiver, after decompressing the received signal (which may or may not be reshaped), the receiver may apply an inverse (or backward) reshaping function to restore the signal to its original codeword distribution and/or to achieve a higher dynamic range.

In HDR coding, image prediction (or reshaping) allows an HDR image to be reconstructed using a baseline standard dynamic range (SDR) image and a set of prediction coefficients representing a backward reshaping function. Legacy devices may simply decode the SDR image; however, HDR displays may reconstruct the HDR image by applying the backward reshaping function to the SDR image. In video coding, such image prediction may be used to improve coding efficiency while maintaining backwards compatibility.

Reconstructing HDR video on mobile devices adds additional challenges because most mobile devices lack special hardware needed to accelerate compute-intensive operations while supporting a desired level of expected quality in HDR imaging. As appreciated by the inventors here, improved techniques for efficient image prediction in mobile applications are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
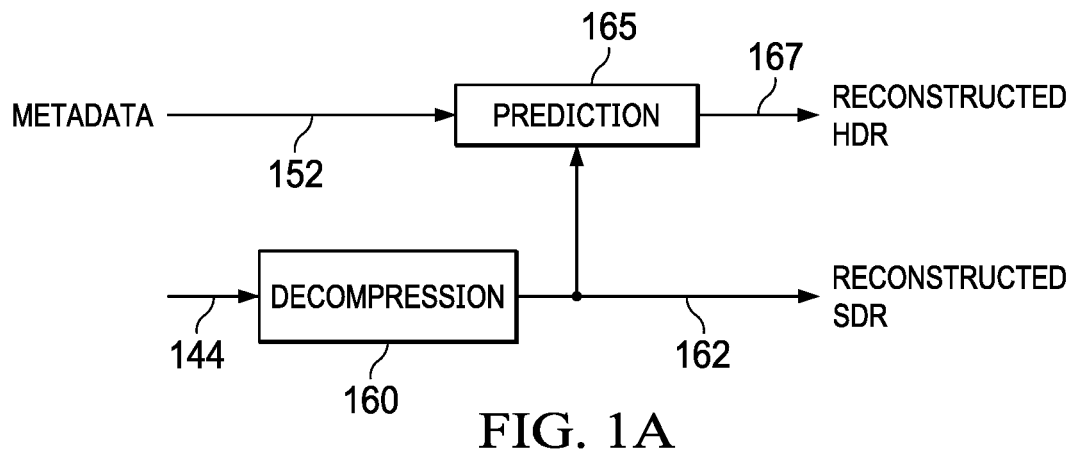
FIG. 1A depicts an example single-layer decoder for HDR data using image prediction.

Image prediction techniques for the efficient coding of images in mobile applications are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to image prediction techniques. In an embodiment, in an apparatus comprising one or more processors, a processor receives an input image encoded in an input dynamic range (e.g., SDR) and metadata for the input image to generate a mapping function to map the input image from the input dynamic range to an output image in an output dynamic range (e.g., HDR). The processor parses a first metadata parameter to identify whether a second metadata parameter is present. If the second metadata parameter is present, then it generates the mapping function using a non-backward predictor (e.g., a tensor-product B-spline (TPB) predictor), else it generates the mapping function using a legacy, backward-compatible, predictor and applies the mapping function to the input image to generate the output image.

In another embodiment, to generate a mapping function using a tensor-product B-spline (TPB) predictor, a processor:
  accesses TPB metadata within the metadata of the input image, wherein the TPB metadata comprise TPB-related prediction parameters; and
  generates based on the TPB metadata a three dimensional look up table (3D-LUT) to map selected triplets of pixel values from an input dynamic range to corresponding output triplets of pixel values in an output dynamic range, wherein the TPB metadata comprise:
  a number of knot points (T) in each of three dimensions of a luma channel and two chroma channels;
  polynomial order (l) values in each of the three dimensions of the luma channel and the two chroma channels;
  prediction coefficients for the luma channel and the two chroma channels; and
  a luma-channel basis flag and two chroma-channel basis flags for determining correlation among the prediction coefficients for the luma channel and the two chroma channels,
and generating the 3D-LUT further comprises:
  if all basis flags are 0, then:
    generating nine temporary arrays, three temporary arrays for each color channel;
  else if the luma-channel basis flag is 0 and one of the two chroma-channel basis flags is 1, then:
    generating three temporary arrays for the luma channel and three temporary arrays for the two chroma channels;
  else if the luma-channel basis flag is 0 and both of the two chroma-channel basis flags are 1, then:
    generating three temporary arrays to be used for all color channels; and
  generating the 3D-LUT for each color channel based on a product of the three temporary arrays for that color channel.

Example HDR Coding System

Figure 1B:
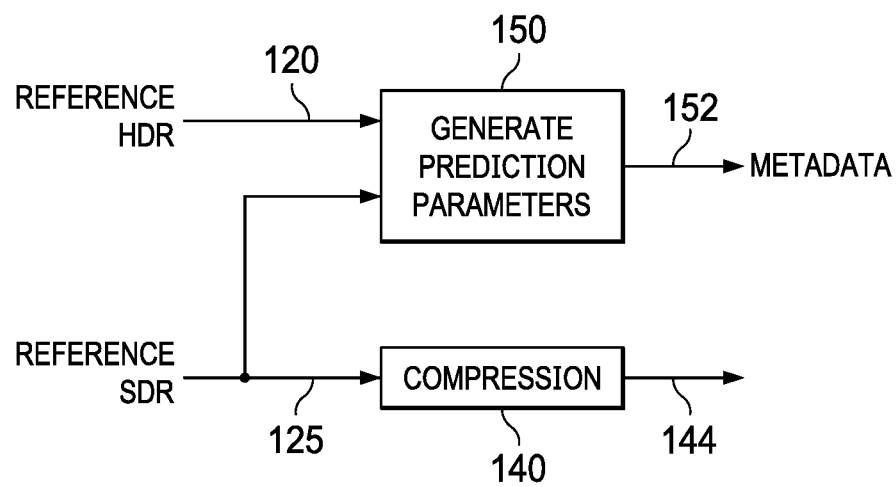
FIG. 1B depicts an example HDR encoder using image prediction.

FIG. 1A illustrates an example single-layer decoder architecture using image prediction, which may be implemented with one or more computing processors in a downstream video decoder. FIG. 1B illustrates an example HDR encoder architecture, which may also be implemented with one or more computing processors in one or more upstream video encoders.

Under this framework, given reference HDR content (120), corresponding SDR content (125) (that is, content that represents the same images as the HDR content, but color-graded and represented in standard dynamic range) is encoded and transmitted in a single layer of a coded video signal (144) by an upstream encoding device that implements the encoder-side codec architecture. The SDR content (144) is received and decoded, in the single layer of the video signal, by a downstream decoding device. Prediction metadata (e.g., forward or backward reshaping parameters) (152) is also encoded and transmitted in the video signal with the SDR content so that HDR display devices can reconstruct HDR content based on the SDR content (144) and the received metadata (152).

In FIG. 1B, in an embodiment, given input HDR data (120), SDR data (125) may be generated from the HDR data via tone-mapping, forward reshaping, manually (during color-grading), or via a combination of techniques known in the art. In another embodiment, given reference SDR data (125), the HDR data (120) may be generated from the SDR data via inverse tone-mapping, backward reshaping, manually (during color-grading), or via a combination of techniques known in the art. A compression block 140 (e.g., an encoder implemented according to any known video coding algorithms, like AVC, HEVC, AV1, and the like) compresses/encodes the SDR images (125) in a single layer 144 of a coded bitstream.

The metadata (152), as generated by unit 150, may be multiplexed as part of the video signal 144, for example, as supplemental enhancement information (SEI) messaging or as part of proprietary messaging. Thus, the metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder architecture of FIG. 1B can be used to avoid directly encoding the input HDR images (120) into coded/compressed HDR images in the video signal; instead, the metadata (152) in the video signal can be used to enable downstream decoding devices to reconstruct the SDR images (125) (which are encoded in the video signal) into reconstructed HDR images (167) that are identical to or closely/optimally approximate the reference HDR images (120).

In some embodiments, as illustrated in FIG. 1A, the video bitstream (144) with the compressed SDR images and the metadata (152) with prediction parameters generated by the encoder are received as input on the decoder side of the codec framework. A decompression block 160 decompresses/decodes compressed video data in the single layer (144) of the video signal into the decoded SDR images (162). Decompression 160 typically corresponds to the inverse of compression 140. The decoded SDR images (162) may be the same as the SDR images (125), subject to quantization errors in the compression block (140) and in the decompression block (160), which may have been optimized for SDR display devices. The decoded SDR images (162) may be outputted in an output SDR video signal (e.g., over an HDMI interface, over a video link, etc.) to be rendered on an SDR display device.

In addition, prediction block 165 (which also may be referred to as a "composer") applies the metadata (152) from the input bitstream to the decompressed data (162) to generate reconstructed HDR images (167). In some embodiments, the reconstructed images represent production-quality or near-production-quality HDR images that are identical to or closely/optimally approximating the reference HDR images (120). The reconstructed images (167) may be outputted in an output HDR video signal (e.g., over an HDMI interface, over a video link, etc.) to be rendered on an HDR display device.

In some embodiments, display management operations specific to the HDR display device may be performed on the reconstructed images (167) as a part of HDR image rendering operations that render the backward reshaped images (167) on the HDR display device.

While FIG. 1A and FIG. 1B depict example embodiments of single-layer HDR encoding and decoding systems. The methods and systems described herein are also applicable to multi-layer and scalable systems where HDR content is transmitted using a base layer and one or more enhancement layer bitstreams, and in a decoder, information from the enhancement layers is added back to the base layer.

HDR Support for Mobile Systems

Because mobile devices (e.g., mobile phones, tablets, and the like) are limited in terms of computing power, storage, and battery life, the playback of HDR content on mobile devices adds additional challenges. For example, unlike HDR-enabled TVs or set-top boxes, most mobile devices do not have dedicated hardware accelerators to reconstruct HDR content. HDR playback on mobile devices relies mostly on software running on general purpose processors. However, without hardware support, the power consumption and potential picture frame dropping become serious issues for playback and perceived visual quality. To alleviate those impacts, instead of adjusting the SDR-to-HDR mapping in every frame, a more "static," (e.g., scene-based), SDR to HDR mapping is preferred since the mapping can be done using a "static" 3D look-up table (LUT) to avoid re-computing mapping LUTs for every video frame. However, existing legacy schemes (e.g., Ref. [1]) which rely on luma prediction using 8-piece polynomials and chroma prediction using multiple-color channel, multiple regression (MMR) predictors (Ref. [2]) cannot provide a satisfactory static mapping to cover a wide color gamut (WCG), especially close to ITU-R Rec. BT. 2020. Tensor-Product B-Spline (TPB)-based prediction can achieve this WCG goal; however, support for TPB metadata may not be possible with existing legacy metadata protocols for HDR imaging (e.g., the current Profiles of Dolby Vision). Given backward-compatibility requirements, example embodiments describe a mobile-optimized profile in which the encoded bitstreams contain two different prediction methods using a single base layer: a) a proposed new TPB prediction method, and b) a legacy, composer-based, method. Before providing a detailed description of the proposed profile, the next sections provide a quick summary of TPB-based prediction and a novel embodiment for fast TPB-based decoding.

Tensor-Product B-Splines

Tensor-Product B-Splines (TPB) may be used to perform predictions in an HDR composer pipeline. B-splines or basis splines are functions that can approximate a given one-dimensional curve using polynomials with continuity constraints at knot points. TPB multiplies multiple B-spline functions together to estimate higher dimensional curves. The accuracy in predicting complex curves while maintaining smooth connectivity at knot points makes TPB a powerful tool for forward and backward reshaping in high-dynamic range processing (Ref. [3]).

As depicted in FIG. 1B, during encoding, HDR pixels are mapped to base layer (BL) pixels (125) in a forward reshaping process. After subsequent compression and decompression, these base layer pixels are mapped back to HDR pixels during backward reshaping. Metadata containing backward reshaping coefficients is transmitted along with the compressed base layer to facilitate backward reshaping at the decoder side. Although TPB-based decoding produces far superior results compared to the existing techniques, the computational complexity is much higher. Later on, embodiments for a fast TPB decoding process, that achieves 100× speed up as compared to regular TPB decoding, will be described. Specifically, embodiments for computing the values of 3D-LUT (3-dimensional lookup table) entries used in the decoding process will be described.

A Full-HD frame contains approximately 2M pixels and an Ultra-HD frame has around 8M pixels. Predicting each of these pixels by applying backward reshaping coefficients directly is not a practical solution for time-sensitive applications. A faster way is to build a 3D-LUT that stores the backward reshaped values at sampling locations in the input pixel value range. Interpolation techniques are then used to find backward reshaped values for pixels not present in the 3D-LUT. For example use-cases, but with no limitation, these 3D-LUTs are now generally 17×17×17 or 33×33×33 in size; however, depending on the desired accuracy of reconstruction and/or available processing power, one may select smaller or larger LUTs as well. That amounts to ~5K or ~36K pixel entries. A 3D-LUT significantly reduces time complexity for any backward reshaping process (TPB-based or MMR-based) by reducing the total number of predictions from 2M or 8M to 5K or 36K for each frame. The proposed method further reduces the time complexity for constructing a TPB-based 3D-LUT by taking into account the properties of TPB functions. Experimental results show that the time required to construct a 3D-LUT with the fast method is one-hundredth of the time to build a 3D-LUT with a traditional method.

TPB Fundamentals

From Ref. [4], a function $f: [a, b] \rightarrow R$ is called a polynomial spline of degree $l \geq 0$ with knots $a = k_0 < \ldots < k_{T-1} = b$, if it fulfills the following conditions:
1. $f(z)$ is (l−1) times continuously differentiable. The special case of l=1 corresponds to $f(z)$ being continuous (but not differentiable). No smoothness requirements are stated for $f(z)$ when l=0.
2. $f(z)$ is a polynomial of degree l on the interval $[k_t, k_{t+1})$ defined by the knots.

B-Spline basis functions are constructed from piecewise polynomials that are fused smoothly at the knots to achieve the desired smoothness constraints. A B-Spline basis function consists of (l+1) polynomial pieces of degree l, which are joined in an (l−1) times continuously differentiable way. Using the complete basis, the function $f(z)$ can be represented through a linear combination of $D=T+l-1$ basis functions, where T is the number of knots, i.e.

$$f(z) = \sum_{t=0}^{D-1} m_t B_t(z).$$

Note that a B-Spline is only positive on an interval based on l+2 knots. The 0-th order of a B-Spline is defined as $$B_t^0(z) = I(k_t \le z \le k_{t+1}) = \begin{cases} 1 & k_t \le z \le k_{t+1} \\ 0 & \text{otherwise} \end{cases} \quad t = 0, \ldots, D-2$$

The higher order of a B-Spline is defined recursively as $$B_t^l(z) = \frac{z - k_{t-1}}{k_t - k_{t-1}} B_{t-1}^{l-1}(z) + \frac{k_{t+1} - z}{k_{t+1} - k_{t+1-l}} B_t^{l-1}(z).$$

One needs 2l outer knots outside [a, b] (as exterior knots) in addition to the interior knots $k_0, k_1, \ldots, k_{T-1}$. For example, for T=8 knots and using 2-d order B-Spline, one will have D=9 basis functions and 9 coefficients $\{m_t\}$ to determine, such that, a 1D curve can be approximated. The following subsection demonstrates a cross-channel TPB coefficients estimation process for luma and chroma backward mapping.

TPB Cross-Color Channel Predictor

Suppose there are P pixels in one picture. Let the triplets $(s_{ji}^y, s_{ji}^{c0}, s_{ji}^{c1})$ and $(v_{ji}^y, v_{ji}^{c0}, v_{ji}^{c1})$ represent the normalized (e.g., in [0, 1]) Y, $C_0$ and $C_1$ values for the i-th pixel in the j-th SDR (base layer) and HDR frames respectively. Take the prediction for luma channel as an example. For a single channel B-Spline predictor, one would like to predict $v_{ji}^y$ from $s_{ji}^y$. With a set of selected knot points, one constructs the required $D^y=T+l-1$ basis functions, $B_{j,t}^y(\ )$. The prediction $\hat{v}_{ji}^y$ using coefficients $\{m_{j,t}^y\}$ is as follows:

$$\hat{v}_{ji}^y = f_i^y(s_{ji}^y) = \sum_{t=0}^{D^y-1} m_{j,t}^y B_{j,t}^y(s_{ji}^y). \quad (1)$$

Tensor-Product B-Splines (TPB) can use information from luma and both the chroma channels $(s_{ji}^y, s_{ji}^{c0}, s_{ji}^{c1})$ to better predict the luma. One needs three independent basis functions in each dimension. In this case, one has $D_0^y$, $D_1^y$, and $D_2^y$ basis functions along Y, $C_0$ and $C_1$ dimension. Denote $t^y$, $t^{c0}$, and $t^{c1}$ as the knot point indices in each of the Y, $C_0$, and $C_1$ dimensions. Given a set of knot points in three dimensions, one has three individual basis function sets: $B_{j,t^y}^{y,0}(s_{ji}^y)$, $B_{j,t^{c0}}^{y,1}(s_{ji}^{c0})$, and $B_{j,t^{c1}}^{y,2}(s_{ji}^{c1})$. The tensor-product B-Spline basis function for predicting the luma channel can be constructed by multiplying all three channels together as shown below.

$$B_{j,t^y,t^{c0},t^{c1}}^{TPB,y}(s_{ji}^y, s_{ji}^{c0}, s_{ji}^{c1}) = B_{j,t^y}^{y,0}(s_{ji}^y) \cdot B_{j,t^{c0}}^{y,1}(s_{ji}^{c0}) \cdot B_{j,t^{c1}}^{y,2}(s_{ji}^{c1}).$$

The cross-channel prediction can be performed as $$\hat{v}_{ji}^y = f_i^{TPB,y}(s_{ji}^y, s_{ji}^{c0}, s_{ji}^{c1}) = \sum_{t^y=0}^{D_0^y-1} \sum_{t^{c0}=0}^{D_1^y-1} \sum_{t^{c1}=0}^{D_2^y-1} m_{j,t^y,t^{c0},t^{c1}}^{TPB,y} \cdot B_{j,t^y,t^{c0},t^{c1}}^{TPB,y}(s_{ji}^y, s_{ji}^{c0}, s_{ji}^{c1}).$$

One can vectorize the 3D index (i.e., $t^y$, $t^{c0}$, and $t^{c1}$) to become a 1D index (i.e., t) to simplify the expression. For the basis function, then:

$$B_{j,t}^{TPB,y}(s_{ji}^y, s_{ji}^{c0}, s_{ji}^{c1}) \equiv B_{j,t^y,t^{c0},t^{c1}}^{TPB,y}(s_{ji}^y, s_{ji}^{c0}, s_{ji}^{c1}).$$

Let $D^y = D_0^y \cdot D_1^y \cdot D_2^y$, then the prediction can be expressed as:

$$\hat{v}_{ji}^y = f_i^{TPB,y}(s_{ji}^y, s_{ji}^{c0}, s_{ji}^{c1}) = \sum_{t=0}^{D^y-1} m_{j,t}^{TPB,y} \cdot B_{j,t}^{TPB,y}(s_{ji}^y, s_{ji}^{c0}, s_{ji}^{c1}).$$

With all P pixels in one frame, one can construct the design matrix $$S_j^{TPB,y} = \begin{bmatrix} B_{j,0}^{TPB,y}(s_{j0}^y, s_{j0}^{c0}, s_{j0}^{c1}) & B_{j,1}^{TPB,y}(s_{j0}^y, s_{j0}^{c0}, s_{j0}^{c1}) & \cdots & B_{j,D^y-1}^{TPB,y}(s_{j0}^y, s_{j0}^{c0}, s_{j0}^{c1}) \\ B_{j,0}^{TPB,y}(s_{j1}^y, s_{j1}^{c0}, s_{j1}^{c1}) & B_{j,1}^{TPB,y}(s_{j1}^y, s_{j1}^{c0}, s_{j1}^{c1}) & & B_{j,D^y-1}^{TPB,y}(s_{j1}^y, s_{j1}^{c0}, s_{j1}^{c1}) \\ \vdots & & \ddots & \vdots \\ B_{j,0}^{TPB,y}(s_{j,P-1}^y, s_{j,P-1}^{c0}, s_{j,P-1}^{c1}) & B_{j,1}^{TPB,y}(s_{j,P-1}^y, s_{j,P-1}^{c0}, s_{j,P-1}^{c1}) & \cdots & B_{j,D^y-1}^{TPB,y}(s_{j,P-1}^y, s_{j,P-1}^{c0}, s_{j,P-1}^{c1}) \end{bmatrix}.$$

The prediction coefficients can be expressed as a vector $$m_j^{TPB,y} = \begin{bmatrix} m_{j,0}^{TPB,y} \\ m_{j,1}^{TPB,y} \\ \vdots \\ m_{j,D^y-1}^{TPB,y} \end{bmatrix}.$$

The prediction can be expressed as $$\hat{v}_j^y = S_j^{TPB,y} m_j^{TPB,y}, \quad (2)$$

where $$\hat{v}_j^y = \begin{bmatrix} \hat{v}_{j0}^y \\ \hat{v}_{j1}^y \\ \vdots \\ \hat{v}_{j,P-1}^y \end{bmatrix}.$$

The optimal solution of $m_j^{TPB,y}$ can be obtained by minimizing a least squared error criterion:

$$m_j^{TPB,y,(opt)} = \left(\left(S_j^{TPB,y}\right)^T S_j^{TPB,y}\right)^{-1} \left(\left(S_j^{TPB,y}\right)^T v_j^y\right). \quad (3)$$

In the above equation, the vector $v_j^y$ represents the ground truth HDR luma values.

$$v_j^y = \begin{bmatrix} v_{j0}^y \\ v_{j1}^y \\ \vdots \\ v_{j,P-1}^y \end{bmatrix}.$$

Similarly, one can build the tensor-product B-Spline predictor for the two chroma channels. Assuming one has $D_0^c$, $D_1^c$, and $D_2^c$ (where c can be c0 or c1) basis functions along Y, $C_0$ and $C_1$ dimension. Given a set of knot points in three dimensions, one has three individual basis function sets $B_{j,t^y}^{c,0}(s_{ji}^y)$, $B_{j,t^{c0}}^{c,1}(s_{ji}^{c0})$, and $B_{j,t^{c1}}^{c,2}(s_{ji}^{c1})$.

The tensor-product basis function for chroma channel is as follows.

$$B_{j,t^y,t^{c0},t^{c1}}^{TPB,c}\left(s_{ji}^y, s_{ji}^{c0}, s_{ji}^{c1}\right) = B_{j,t^y}^{c,0}\left(s_{ji}^y\right) \cdot B_{j,t^{c0}}^{c,1}\left(s_{ji}^{c0}\right) \cdot B_{j,t^{c1}}^{c,2}\left(s_{ji}^{c1}\right). \quad (4)$$

One can vectorize the 3D index (i.e., $t^y$, $t^{c0}$, and $t^{c1}$) to become a 1D index (i.e., t) to simplify the equation. Let $D^c = D_0^c \cdot D_1^c \cdot D_2^c$, $$\hat{v}_{ji}^c = f_j^{TPB,c}\left(s_{ji}^y, s_{ji}^{c0}, s_{ji}^{c1}\right) = \sum_{t=0}^{D^c-1} m_{j,t}^{TPB,c} \cdot B_{j,t}^{TPB,c}\left(s_{ji}^y, s_{ji}^{c0}, s_{ji}^{c1}\right). \quad (5)$$

With all P pixels in one frame, one can construct the matrix form $$S_j^{TPB,c} = \begin{bmatrix} B_{j,0}^{TPB,c}(s_{j0}^y, s_{j0}^{c0}, s_{j0}^{c1}) & B_{j,1}^{TPB,c}(s_{j0}^y, s_{j0}^{c0}, s_{j0}^{c1}) & \cdots & B_{j,D^c-1}^{TPB,c}(s_{j0}^y, s_{j0}^{c0}, s_{j0}^{c1}) \\ B_{j,0}^{TPB,c}(s_{j1}^y, s_{j1}^{c0}, s_{j1}^{c1}) & B_{j,1}^{TPB,c}(s_{j1}^y, s_{j1}^{c0}, s_{j1}^{c1}) & \cdots & B_{j,D^c-1}^{TPB,c}(s_{j1}^y, s_{j1}^{c0}, s_{j1}^{c1}) \\ \vdots & \vdots & \ddots & \vdots \\ B_{j,0}^{TPB,c}(s_{j,P-1}^y, s_{j,P-1}^{c0}, s_{j,P-1}^{c1}) & B_{j,1}^{TPB,c}(s_{j,P-1}^y, s_{j,P-1}^{c0}, s_{j,P-1}^{c1}) & \cdots & B_{j,D^c-1}^{TPB,c}(s_{j,P-1}^y, s_{j,P-1}^{c0}, s_{j,P-1}^{c1}) \end{bmatrix}.$$

The prediction coefficients can be expressed as a vector $$m_j^{TPB,c} = \begin{bmatrix} m_{j,0}^{TPB,c} \\ m_{j,1}^{TPB,c} \\ \vdots \\ m_{j,D^c-1}^{TPB,c} \end{bmatrix}.$$

The prediction can be expressed as $$\hat{v}_j^c = S_j^{TPB,c} m_j^{TPB,c}. \quad (6)$$

The optimal solution of $m_j^{TPB,c}$ can be obtained via a least squared error minimization, as:

$$m_j^{TPB,c,(opt)} = \left(\left(s_j^{TPB,c}\right)^T s_j^{TPB,c}\right)^{-1} \left(\left(s_j^{TPB,c}\right)^T v_j^c\right). \quad (7)$$

It is worthy to note that if all three channels have the same tensor-product basis functions, then the S matrix will be identical, i.e.

$$S_j^{TPB} \equiv S_j^{TPB,y} = S_j^{TPB,c0} = S_j^{TPB,c1}.$$

At the decoder side, one just needs to compute $S_j^{TPB}$. There is no need to compute it three times for each channel. Then the predicted value for each channel will be simply the multiplication of the S matrix with corresponding prediction coefficients.

The location of knot points can be uniformly or non-uniformly distributed. Uniform distribution simplifies the decoding process and reduces the amount of metadata to be sent to the decoders. Instead of the locations of all the knot points, only the total number of knot points is required. Assuming uniformly-distributed knot points, in an embodiment, the TPB metadata consists of:

TPB Parameters number of knot points T in each of the three dimensions of the three channels.
polynomial order l in each of the three dimensions of the three channels TPB Coefficients coefficients for luma channel $m_j^{TPB,y}$
coefficients for chroma C0 channel $m_j^{TPB,c0}$
coefficients for chroma C1 channel $m_j^{TPB,c1}$ Auxiliary Data These parameters may not be directly related to tensor-product B-spline representation, but they do assist in TPB-based prediction. A more detailed description is presented later.
zero coefficients arrays: $\phi^y$, $\phi^{c0}$, $\phi^{c1}$; indicate which of the TPB coefficients are zeros to reduce transmission overhead (allows for using a single bit per coefficient vs using multiple bits per coefficient).
basis flags: $\psi_{basis}^y = 0$ and $\psi_{basis}^{c0}$, $\psi_{basis}^{c1}$
  (if $\psi_{basis}^{c0/c1} = 1$, then TPB parameters and zero coefficient arrays are the same as in the previous channel)
  (if $\psi_{basis}^{c0/c1} = 0$, then TPB parameters and zero coefficient arrays are different)
coefficient data type
clipping values present flag: $\psi_{clip}$
  (=1 low/high input clipping values are used)
  (=0 low/high input clipping values are not used)
low input clipping values: $s_{min}^y$, $s_{min}^{c0}$, $s_{min}^{c1}$
high input clipping values: $s_{max}^y$, $s_{max}^{c0}$, $s_{max}^{c1}$ An example of TPB parameters present in the metadata is depicted in Table 1.

TABLE 1

Example of TPB parameters in TPB-related metadata

|  | Dimension Y | Dimension C0 | Dimension C1 |
|---|---|---|---|
| Channel Y | $l^{y,y}, T^{y,y}$ | $l^{y,c0}, T^{y,c0}$ | $l^{y,c1}, T^{y,c1}$ |
| Channel C0 | $l^{c0,y}, T^{c0,y}$ | $l^{c0,c0}, T^{c0,c0}$ | $l^{c0,c1}, T^{c0,c1}$ |
| Channel C1 | $l^{c1,y}, T^{c1,y}$ | $l^{c1,c0}, T^{c1,c0}$ | $l^{c1,c1}, T^{c1,c1}$ |

This metadata is transmitted along with the compressed base layer to the decoders. The remaining of the TPB parameters, such as, knot points and the knot-points distance h, are derived from the above parameters. Assuming a uniform distribution of knot points for the equations, for simplicity, one can drop the superscripts and subscripts for the symbols. Then, for T knot points, the distance between the knot points, h, is calculated as:

$$h = \frac{1}{T-1}.$$

Knot points $\{k_t\}$ may form a 1D array that can be derived from the TPB parameters in the metadata as follows.

$$k_t = -l \times h + t \times h.$$

In the equation above, $t \in [K(l-1), 2 \times l + T - 1]$ and $K = \{1,1,2\}$. These derived TPB parameters and the original parameters in the metadata are used together in the decoding process.

TPB Decoding Process

In an embodiment, as explained earlier, it is worthwhile to build a 3D-LUT to store the mapping from the SDR (base layer) to the HDR domain for sample pixels.

$$(\hat{v}_{ji}^y, \hat{v}_{ji}^{c0}, \hat{v}_{ji}^{c1}) = \mathcal{L}_j^{TPB}(s_{ji}^y, s_{ji}^{c0}, s_{ji}^{c1}). \quad (8)$$

Let us represent the TPB-based 3D-LUT that maps input SDR pixel $(s_{ji}^y, s_{ji}^{c0}, s_{ji}^{c1})$ to output HDR pixel $(\hat{v}_{ji}^y, \hat{v}_{ji}^{c0}, \hat{v}_{ji}^{c1})$ by $\mathcal{L}_j^{TPB}$. Here i is the pixel index in the 3D-LUT and j is the frame index. Let the size of $\mathcal{L}_j^{TPB}$ be represented by $L_0 \times L_1 \times L_2$. In an example, without limitation, a 3D-LUT can be 17×17×17 or 33×33×33 in size, i.e., $L_0=L_1=L_2=17$ or $L_0=L_1=L_2=33$ Metadata received from the composite bitstream is parsed to get the TPB parameters, coefficients and the auxiliary data. Then a 3D-LUT can be constructed using two methods:

1. Regular Method: For each 3D-LUT index, TPB parameters generate the basis functions and the TPB coefficients compute the output pixel value with the basis functions.
2. Fast Method: Frequently used values of the basis functions are stored in one or more 2D arrays. These arrays are subsequently used with TPB coefficients to compute the output pixel values.

Both methods are described in the following subsections. Henceforth it is assumed that the TPB knot points are uniformly distributed. TPB parameters are tabulated below, where every dimension in each channel has its corresponding knot point array $\{k_t\}$, knot point distance h, and TPB order l.

TABLE 2

TPB parameters for different channels and dimensions as used in TPB-based prediction

|  | Dimension Y | Dimension C0 | Dimension C1 |
|---|---|---|---|
| Channel Y | $\{k_t^{y,y}\}, l^{y,y}, h^{y,y}$ | $\{k_t^{y,c0}\}, l^{y,c0}, h^{y,c0}$ | $\{k_t^{y,c1}\}, l^{y,c1}, h^{y,c1}$ |
| Channel C0 | $\{k_t^{c0,y}\}, l^{c0,y}, h^{c0,y}$ | $\{k_t^{c0,c0}\}, l^{c0,c0}, h^{c0,c0}$ | $\{k_t^{c0,c1}\}, l^{c0,c1}, h^{c0,c1}$ |
| Channel C1 | $\{k_t^{c1,y}\}, l^{c1,y}, h^{c1,y}$ | $\{k_t^{c1,c0}\}, l^{c1,c0}, h^{c1,c0}$ | $\{k_t^{c1,c1}\}, l^{c1,c1}, h^{c1,c1}$ |

Regular Method for TPB-Based 3D-LUT Construction

When the knot points are uniformly distributed, including the exterior knot points, the B-Spline basis function can be expressed by a linear combination of truncated polynomials. An l-th order truncated polynomial is defined as $$(x-a)_+^l = \begin{cases} (x-a)^l & x \geq a \\ 0 & x < a \end{cases}.$$

In the following, $\{k_t\}$ denotes knot points and h denotes the distance between two consecutive knot points for a uniform distribution. For simplicity, the core equations are defined without the channel-specific or dimension-specific details. The channel and dimension specific notations will be reintroduced when explaining the luma- or chroma-specific TPB prediction equations.

A. 1-st Order

The 1-st order of the t-th B-Spline basis function can be expressed as $$B_t^1(x, k_t, h) = \left(\frac{1}{h}\right)[(x-k_{t-1})_+ - 2(x-k_t)_+ + (x-k_{t+1})_+]. \quad (9)$$

$B_t^1(x, k_t, h)$ is only positive between $[k_{t-1} \; k_{t+1}]$ or 2 h interval. It will be 0 outside this range.

B. 2-nd Order

The 2-nd order of the t-th B-Spline basis function can be expressed as $$B_t^2(x, k_t, h) = \\ \frac{1}{2}\left(\frac{1}{h}\right)^2[(x-k_{t-1})_+^2 - 3(x-k_t)_+^2 + 3(x-k_{t+1})_+^2 - (x-k_{t+2})_+^2]. \quad (10)$$

$B_t^2(x, k_t, h)$ is only positive between $[k_{t-1}\ k_{t+2}]$ or 3 h interval. It will be 0 outside this range.

C. 3-rd Order

The 3-rd order of the t-th B-Spline basis function can be expressed as $$B_t^3(x, k_t, h) = \frac{1}{6}\left(\frac{1}{h}\right)^3 [(x - k_{t-2})_+^3 - 4(x - k_{t-1})_+^3 + 6(x - k_t)_+^3 - 4(x - k_{t+1})_+^3 + (x - k_{t+2})_+^3]. \quad (11)$$

$B_t^3(x, k_t, h)$ is only positive between $[k_{t-2}\ k_{t+2}]$ or 4 h interval. It will be 0 outside this range.

Having the truncated polynomial expression avoids the need to apply the recursive B-Spline basis function at the decoder side. Note that a recursive B-Spline expression is not friendly for hardware implementation. The recursive expression takes more time and memory space to compute. The truncated polynomial expression can save the computation (by trading the flexibility to have "non-uniform" knot points). The overall uniform knot point TPB basis function for single channel $B_t$ is described as follows.

$$B_t(x, k_t, h, l) = \begin{cases} B_t^1(x, k_t, h) & \text{for } l = 1 \\ B_t^2(x, k_t, h) & \text{for } l = 2 \\ B_t^3(x, k_t, h) & \text{for } l = 3 \end{cases} \quad (12)$$

The above single channel basis function can be extended to cross-channel TPB basis function $B_{j,t}^{TPB}$ by taking the product of the B-Spline functions in the three dimensions. Let us take the luma channel prediction as an example. Using $\{k_p^{y,y}\}$, $\{k_q^{y,c0}\}$ and $\{k_r^{y,c1}\}$ as knot points for dimensions Y, C0 and C1 for luma channel predictor, the distance between every two consecutive knot points can be expressed as $h^{y,y}$, $h^{y,c0}$ and $h^{y,c1}$ respectively. The orders of TPB in these three dimensions are $l^{y,y}$, $l^{y,c0}$ and $l^{y,c1}$ respectively. Then the following equation gives the cross channel TPB basis function for luma channel predictor $B_{j,t}^{TPB,y}$.

$$B_{j,t}^{TPB,y}(s_{ji}^y, s_{ji}^{c0}, s_{ji}^{c1}, k_p^{y,y}, k_q^{y,c0}, k_r^{y,c1}, h^{y,y}, h^{y,c0}, h^{y,c1}, l^{y,y}, l^{y,c0}, l^{y,c1}) = B_{j,p}^{y,0}(s_{ji}^y, k_p^{y,y}, h^{y,y}, l^{y,y}) \cdot B_{j,q}^{y,1}(s_{ji}^{c0}, k_q^{y,c0}, h^{y,c0}, l^{y,c0}) \cdot B_{j,r}^{y,2}(s_{ji}^{c1}, k_r^{y,c1}, h^{y,c1}, l^{y,c1}).$$

The t-th TPB basis function above is formed by multiplying the p-th, q-th, and r-th B-Spline functions, one in each of the three dimensions Y, C0 and C1. Please note that each of the three inputs $s_{ji}^y$, $s_{ji}^{c0}$, $s_{ji}^{c1}$ are clipped using their respective low clipping values, i.e., $s_{min}^y$, $s_{min}^{c0}$, $s_{min}^{c1}$ and high clipping values, namely $s_{max}^y$, $s_{max}^{c0}$, $s_{max}^{c1}$, received from the metadata as shown here.

$s_{ji}^y = \text{clip3}(s_{ji}^y, s_{min}^y, s_{max}^y),$ $s_{ji}^{c0} = \text{clip3}(s_{ji}^{c0}, s_{min}^{c0}, s_{max}^{c0}),$ $s_{ji}^{c1} = \text{clip3}(s_{ji}^{c1}, s_{min}^{c1}, s_{max}^{c1}).$ The clip3(w, $w_{min}$, $w_{max}$) function clips the value of w to keep it within the range [$w_{min}$, $w_{max}$]. In other words, if $w < w_{min}$ then $w = w_{min}$. Else if $w > w_{max}$, then $w = w_{max}$. Otherwise, the value of w is not changed. Given the clipped SDR pixel ($s_{ji}^y$, $s_{ji}^{c0}$, $s_{ji}^{c1}$), one predicts the HDR values $\hat{v}_{ji}^y$ using the luma channel TPB coefficients.

$$\hat{v}_{ji}^y = \Sigma_{t=0}^{D^y-1} m_{j,t}^{TPB,y} \cdot B_{j,t}^{TPB,y}(s_{ji}^y, s_{ji}^{c0}, s_{ji}^{c1}, k_p^{y,y}, k_q^{y,c0}, k_r^{y,c1}, h^{y,y}, h^{y,c0}, h^{y,c1}, l^{y,y}, l^{y,c0}, l^{y,c1}).$$

Denote computing a B-Spline function value, such as $B_{j,p}^{y,0}(s_{ji}^y, k_p^{y,y}, h^{y,y}, l^{y,y})$ for a given $s_{ji}^y$ and a given knot point $k_p^{y,y}$, as one B-Spline operation. Given:
Number of knot points $T^{y,y} = T^{y,c0} = T^{y,c1} = 9$
Order $l^{y,y} = l^{y,c0} = l^{y,c1} = 3$
Then $$D^y = (T^{y,y} + l^{y,y} - 1) \times (T^{y,c0} + l^{y,c0} - 1) \times (T^{y,c1} + l^{y,c1} - 1)$$

$$= 11 \times 11 \times 11$$

$$= 1331$$

So, 1331 B-Spline operations are required to evaluate each 3D-LUT entry.
If TPB predictions are computed using the regular method, then for each of the 3D-LUT entry, $D^y$ operations are repeated, which requires $$\text{Total }B\text{ - Spline Operations} = D^y \times L_0 \times L_1 \times L_2$$

$$= 1331 \times 33 \times 33 \times 33$$

$$= 47{,}832{,}147$$

For a 33×33×33 LUT, the total is about 47 million B-Spline operations to predict all the luma HDR values.

For chroma channels, let us represent $\{k_p^{c,y}\}$, $\{k_q^{c,c0}\}$ and $\{k_r^{c,c1}\}$ as knot points for dimensions Y, C0 and C1 for a chroma c=c0, c1 channel predictor. The distance between every two consecutive knot points can be expressed as $h^{c,y}$, $h^{c,c0}$ and $h^{c,c1}$ respectively. The order of TPB in these three dimensions are $l^{c,y}$, $l^{c,c0}$ and $l^{c,c1}$ respectively. Then the following equation gives the cross channel TPB basis function for chroma channel predictor $B_{j,t}^{TPB,c}$.

$$B_{j,t}^{TPB,c}(s_{ji}^y, s_{ji}^{c0}, s_{ji}^{c1}, k_p^{c,y}, k_q^{c,c0}, k_r^{c,c1}, h^{c,y}, h^{c,c0}, h^{c,c1}, l^{c,y}, l^{c,c0}, l^{c,c1}) = B_{j,p}^{c,0}(s_{ji}^y, k_p^{c,y}, h^{c,y}, l^{c,y}) \cdot B_{j,q}^{c,1}(s_{ji}^{c0}, k_q^{c,c0}, h^{c,c0}, l^{c,c0}) \cdot B_{j,r}^{c,2}(s_{ji}^{c1}, k_r^{c,c1}, h^{c,c1}, l^{c,c1}).$$

One can then predict the HDR values $\hat{v}_{ji}^{c0}$ and $\hat{v}_{ji}^{c1}$ using the chroma channel TPB coefficients.

$$\hat{v}_{ji}^c = \Sigma_{t=0}^{D^c-1} m_{j,t}^{TPB,c} \cdot B_{j,t}^{TPB,c}(s_{ji}^y, s_{ji}^{c0}, s_{ji}^{c1}, k_p^{c,y}, k_q^{c,c0}, k_r^{c,c1}, h^{c,y}, h^{c,c0}, h^{c,c1}, l^{c,y}, l^{c,c0}, l^{c,c1}).$$

Similarly to the luma channel predictor, it takes around 47M B-Spline operations to compute all the HDR values in a 33×33×33 LUT for one chroma channel, given the same settings as those used for the luma channel predictor.

After all the three predicted HDR values are obtained, after clipping to the valid signal range, they are saved in the 3D-LUT $\mathcal{L}_j^{TPB}$. For each entry in $\mathcal{L}_j^{TPB}$ the corresponding HDR pixel $(\hat{v}_{ji}^y, \hat{v}_{ji}^{c0}, \hat{v}_{ji}^{c1})$ is predicted using the three cross-channel TPB predictors. The entire process of calculating the truncated polynomials, B-Spline functions, TPB basis function and TPB prediction is repeated for every single entry in the 3D-LUT. This makes the process too slow for time sensitive applications; however, many of the computations are repeated over and over for each entry of the 3D-LUT. These repetitive operations can be avoided by saving their values in arrays and reusing these stored values instead of calculating them every time. This gives significant savings in compute time as explained in the next subsection.

Fast Method for TPB-Based 3D-LUT Construction

To speed up the process of predicting the HDR pixels from the base layer pixels for the 3D-LUT entries, in an embodiment, a faster method uses a small amount of extra memory to store intermediate results that are frequently used in the prediction process. Without the loss of generality, as an example, let us consider the luma channel predictor. The TPB basis function for the cross-channel luma predictor is given by:

$$B_{j,t}^{TPB,y}(s_{ji}^y, s_{ji}^{c0}, s_{ji}^{c1}, k_p^{y,y}, k_q^{y,c0}, k_r^{y,c1}, h^{y,y}, h^{y,c0}, h^{y,c1}, l^{y,y}, l^{y,c0}, l^{y,c1}) = \quad (13)$$
$$B_{j,p}^{y,0}(s_{ji}^y, k_p^{y,y}, h^{y,y}, l^{y,y}) \cdot$$
$$B_{j,q}^{y,1}(s_{ji}^{c0}, k_q^{y,c0}, h^{y,c0}, l^{y,c0}) \cdot B_{j,r}^{y,2}(s_{ji}^{c1}, k_r^{y,c1}, h^{y,c1}, l^{y,c1}).$$

If one focuses on the constituent B-Spline functions:
1. First Dimension $B_{j,p}^{y,0}(s_{ji}^y, k_p^{y,y}, h^{y,y}, l^{y,y})$:
   a. Here, $p \in [0, T^{y,y}+l^{y,y}-2]$ as there is a total of $T^{y,y}+l^{y,y}-1$ number of B-Spline functions.
   b. TPB order $l^{y,y}$ and $h^{y,y}$ is the same for all these B-Splines.
   c. Knot points $k_p^{y,y}$ are dependent on p.
   d. There are $L_0$ different possible values of $s_{ji}^y$ for a $L_0 \times L_1 \times L_2$ 3D-LUT $\mathcal{L}_j^{TPB}$.
   e. There are $(T^{y,y}+l^{y,y}-1) \times L_0$ different possible outcomes of the function and can be stored in a 2D array $A^{y,y}$.

2. Second Dimension $B_{j,q}^{y,1}(s_{ji}^{c0}, k_q^{y,c0}, h^{y,c0}, l^{y,c0})$:
Following a similar reasoning as above:
   a. There are $(T^{y,c0}+l^{y,c0}-1) \times L_1$ different possible outcomes of the function and can be stored in a 2D array $A^{y,c0}$.

3. Third Dimension $B_{j,r}^{y,2}(s_{ji}^{c1}, k_r^{y,c1}, h^{y,c1}, l^{y,c1})$:
Following a similar reasoning as before:
   a. There are $(T^{y,c1}+l^{y,c1}-1) \times L_2$ different possible outcomes of the function and can be stored in a 2D array $A^{y,c1}$.

Note: Functions $B_{j,p}^{y,0}(s_{ji}^y, k_p^{y,y}, h^{y,y}, l^{y,y})$, $B_{j,q}^{y,1}(s_{ji}^{c0}, k_q^{y,c0}, h^{y,c0}, l^{y,c0})$, and $B_{j,r}^{y,2}(s_{ji}^{c1}, k_r^{y,c1}, h^{y,c1}, l^{y,c1})$, are dimension-specific variations of the generalized function $B_t(x, k_t, h, l)$ described in equation (12), where, for simplicity subscripts and superscripts were dropped. The subscript t in equation (12), is replaced with subscripts p, q, or r for each of the first, second, and third dimensions under consideration.

Now the TPB basis function equation for luma prediction can be represented in the form of arrays as:

$$B_{j,t}^{TPB,y}(s_{ji}^y, s_{ji}^{c0}, s_{ji}^{c1}, k_p^{y,y}, k_q^{y,c0}, k_r^{y,c1}, h^{y,y}, h^{y,c0}, h^{y,c1}, l^{y,y}, l^{y,c0}, l^{y,c1}) = \quad (14)$$
$$A^{y,y}(s_{ji}^y, k_p^{y,y}) \cdot A^{y,c0}(s_{ji}^{c0}, k_q^{y,c0}) \cdot A^{y,c1}(s_{ji}^{c1}, k_r^{y,c1})$$

One can predict the HDR values $\hat{v}_{ji}^y$ using the luma channel TPB coefficients.

$$\hat{v}_{ji}^y = \sum_{t=0}^{D^y-1} m_{j,t}^{TPB,y}. \quad (15)$$
$$B_{j,t}^{TPB,y}(s_{ji}^y, s_{ji}^{c0}, s_{ji}^{c1}, k_p^{y,y}, k_q^{y,c0}, k_r^{y,c1}, h^{y,y}, h^{y,c0}, h^{y,c1}, l^{y,y}, l^{y,c0}, l^{y,c1})$$

Even though $D^y$ additions are required, they only access the values pre-computed in the arrays. Accessing arrays is much faster than calculating the corresponding B-Spline function. If one applies the same settings for knot points and order as used earlier, i.e.
Number of knot points $T^{y,y}=T^{y,c0}=T^{y,c1}=9$
Order $l^{y,y}=l^{y,c0}=l^{y,c1}=3$,
Then $$\text{Total } B\text{-Spline Operations} = (T^{y,y} + l^{y,y} - 1) \times L_0 + (T^{y,c0} + l^{y,c0} - 1) \times L_1 + (T^{y,c1} + l^{y,c1} - 1) \times L_2$$
$$= 11 \times 33 + 11 \times 33 + 11 \times 33$$
$$= 1089$$

So, only 1089 B-Spline operations are required to evaluate all entries of 33×33×33 3D-LUT for luma channel.

If TPB predictions are computed using the fast method, then it takes 1089 B-Spline operations to compute all the luma HDR values in the 3D-LUT. On the contrary, the regular method needs 47M B-Spline operations to predict all the HDR luma values in the 3DLUT.

The following equation gives the cross-channel TPB basis function for chroma channel predictor $B_{j,t}^{TPB,c}$.

$$B_{j,t}^{TPB,c}(s_{ji}^y, s_{ji}^{c0}, s_{ji}^{c1}, k_p^{c,y}, k_q^{c,c0}, k_r^{c,c1}, h^{c,y}, h^{c,c0}, h^{c,c1}, l^{c,y}, l^{c,c0}, l^{c,c1}) = \quad (16)$$
$$B_{j,p}^{c,0}(s_{ji}^y, k_p^{c,y}, h^{c,y}, l^{c,y}) \cdot$$
$$B_{j,q}^{c,1}(s_{ji}^{c0}, k_q^{c,c0}, h^{c,c0}, l^{c,c0}) \cdot B_{j,r}^{c,2}(s_{ji}^{c1}, k_r^{c,c1}, h^{c,c1}, l^{c,c1}).$$

The B-Spline functions can be replaced with the array entries here as well. The details are skipped here, as they are similar to the derivations in the luma channel predictor.

$$B_{j,t}^{TPB,c}(s_{ji}^y, s_{ji}^{c0}, s_{ji}^{c1}, k_p^{c,y}, k_q^{c,c0}, k_r^{c,c1}, h^{c,y}, h^{c,c0}, h^{c,c1}, l^{c,y}, l^{c,c0}, l^{c,c1}) = \quad (17)$$
$$A^{c,y}(s_{ji}^y, k_p^{c,y}) \cdot A^{c,c0}(s_{ji}^{c0}, k_1^{c,c0}) \cdot A^{c,c1}(s_{ji}^{c1}, k_r^{c,c1}),$$

For the chroma channels the number of B-Spline operations is 1089 to predict all the HDR chroma values for a 33×33×33 3DLUT with the above settings. One can reduce the number of B-Spline operations further, if the TPB parameters in metadata for two or more channels are the same. For the discussion to follow, let the collection of TPB parameters present in the metadata for a channel c=y, c0, c1 be denoted by, $$\Gamma^c = \{T^{c,y}, T^{c,c0}, T^{c,c1}, l^{c,y}, l^{c,c0}, l^{c,c1}\}.$$

Figure 2A:
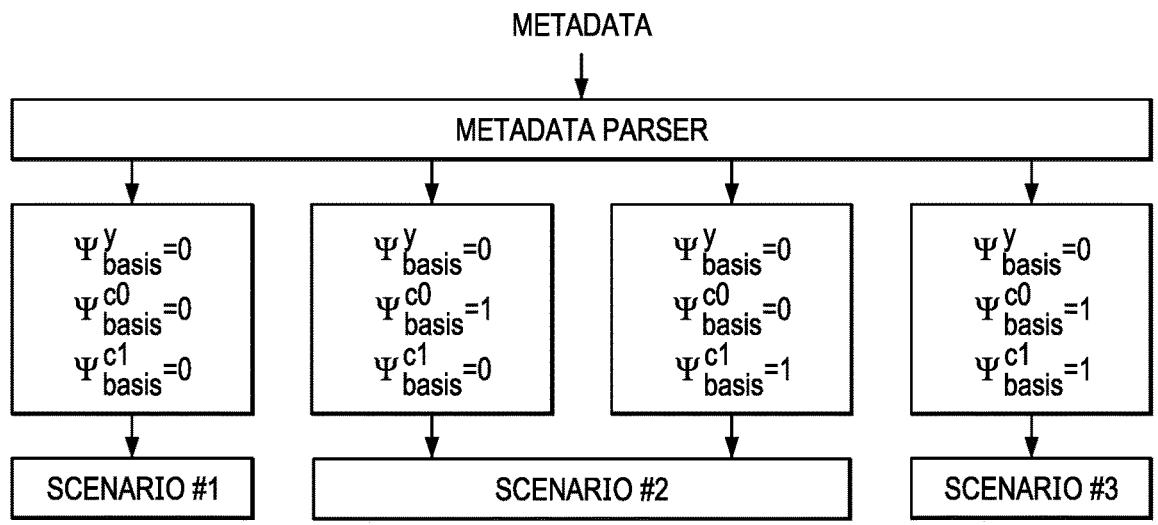
FIGS. 2A and 2B depict an example process flow for fast tensor-product B-spline (TPB) prediction according to an embodiment of this invention.

The number of knot points T and orders l are the only TPB parameters present in the metadata. Note that TPB coefficients are not included in the definition of TPB parameters. If the parameter collections for two channels are compared elementwise and all the corresponding values are equal, then the TPB parameters for these two channels are considered to be the same. Otherwise, the TPB parameters for the two channels are different. This gives rise to three common scenarios:

1. Luma and chroma TPB parameters are different
2. Chroma TPB parameters are same but luma TPB parameters are different
3. Luma and chroma TPB parameters are the same These scenarios can be identified from the basis flags $\psi_{basis}^{y}$, $\psi_{basis}^{c0}$, and $\psi_{basis}^{c1}$ in the metadata. An example flow chart of these three scenarios is depicted in FIG. 2A. Henceforth, without loss of generality, it is assumed that the clipping values for all the three channels are different in these three scenarios. That is:

$$s_{min}^{y} \neq s_{min}^{c0} \neq s_{min}^{c1}$$

$$s_{max}^{y} \neq s_{max}^{c0} \neq s_{max}^{c1}$$

Scenario 1: Luma and Chroma TPB Parameters are Different

This is the default, worst case, scenario, where the TPB parameters for all the channels are different from each other. Mathematically, it can be expressed as $\Gamma^{y} \neq \Gamma^{c0} \neq \Gamma^{c1}$ or more elaborately:

$$\{T^{y,y}, T^{y,c0}, T^{y,c1}, l^{y,y}, l^{y,c0}, l^{y,c1}\} \neq \{T^{c0,y}, T^{c0,c0}, T^{c0,c1}, l^{c0,y}, l^{c0,c0}, l^{c0,c1}\},$$

$$\{T^{y,y}, T^{y,c0}, T^{y,c1}, l^{y,y}, l^{y,c0}, l^{y,c1}\} \neq \{T^{c1,y}, T^{c1,c0}, T^{c1,c1}, l^{c1,y}, l^{c1,c0}, l^{c1,c1}\},$$

$$\{T^{c0,y}, T^{c0,c0}, T^{c0,c1}, l^{c0,y}, l^{c0,c0}, l^{c0,c1}\} \neq \{T^{c1,y}, T^{c1,c0}, T^{c1,c1}, l^{c1,y}, l^{c1,c0}, l^{c1,c1}\}.$$

Figure 3A:
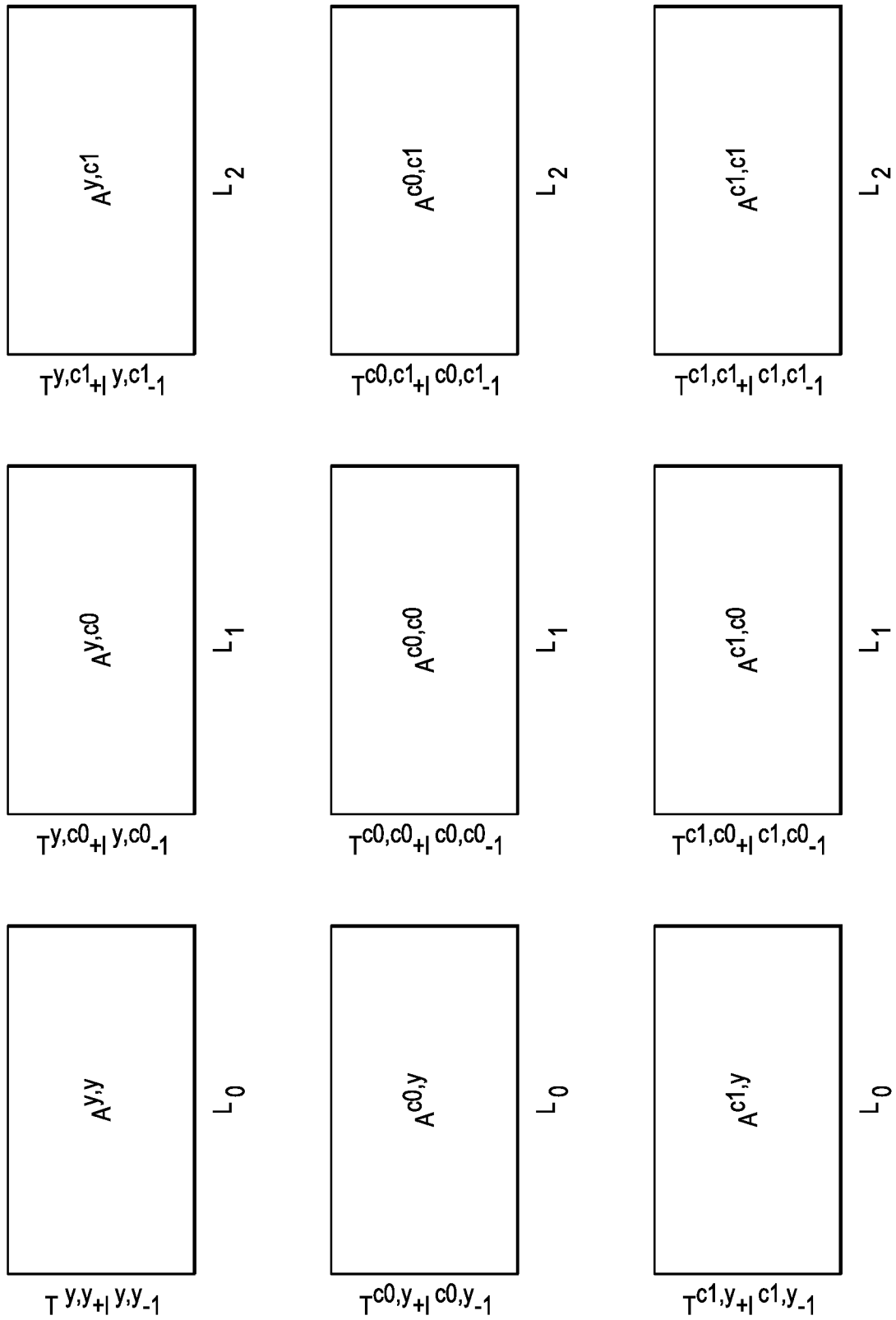
FIGS. 3A, 3B, and 3C depict example temporary storage arrays required for fast TPB prediction according to embodiments of this invention.

This scenario can also be directly deduced from the metadata syntax, for brevity, to also be referred to as reference-processing-unit (RPU) syntax, as well, when basis flags are 0, $\psi_{basis}^{y}=0$, $\psi_{basis}^{c0}=0$, $\psi_{basis}^{c1}=0$. There will be three different 2D arrays for each channel to store the B-Spline functions. Table 3 shows the 2D arrays in this scenario and FIG. 3A depicts an example illustration.

TABLE 3

Arrays for storing B-Spline functions for scenario 1

|  | Dimension Y | Dimension C0 | Dimension C1 |
|---|---|---|---|
| Channel Y | $A^{y,y}$ | $A^{y,c0}$ | $A^{y,c1}$ |
| Channel C0 | $A^{c0,y}$ | $A^{c0,c0}$ | $A^{c0,c1}$ |
| Channel C1 | $A^{c1,y}$ | $A^{c1,c0}$ | $A^{c1,c1}$ |

To estimate the number of B-Spline operations, let us assume that $\Gamma^{y}=\{9,9,9,3,3,3\}$, $\Gamma^{c0}=\{9,9,9,3,3,3\}$ and $\Gamma^{c1}=\{9,9,9,3,3,3\}$. Even though these example values resemble the case that all channels have the same TPB parameters, using these values will help us to do a fair comparison between scenarios. There are 1089 B-Spline operations for each channel. The total number of B-Spline operations in this scenario will be 1089×=3,267 for constructing a complete 3D-LUT of size 33×33×33.

Scenario 2: Chroma TPB Parameters are Same but Luma TPB Parameters are Different This scenario is quite common as the chroma channels usually have the same TPB parameters and the luma channel has different parameters, i.e., $\Gamma^{y} \neq \Gamma^{c0} = \Gamma^{c1}$. The corresponding equations are shown below.

$$\{T^{y,y}, T^{y,c0}, T^{y,c1}, l^{y,y}, l^{y,c0}, l^{y,c1}\} \neq \{T^{c0,y}, T^{c0,c0}, T^{c0,c1}, l^{c0,y}, l^{c0,c0}, l^{c0,c1}\},$$

$$\{T^{y,y}, T^{y,c0}, T^{y,c1}, l^{y,y}, l^{y,c0}, l^{y,c1}\} \neq \{T^{c1,y}, T^{c1,c0}, T^{c1,c1}, l^{c1,y}, l^{c1,c0}, l^{c1,c1}\},$$

$$\{T^{c0,y}, T^{c0,c0}, T^{c0,c1}, l^{c0,y}, l^{c0,c0}, l^{c0,c1}\} = \{T^{c1,y}, T^{c1,c0}, T^{c1,c1}, l^{c1,y}, l^{c1,c0}, l^{c1,c1}\}.$$

Figures 3B, 3C:
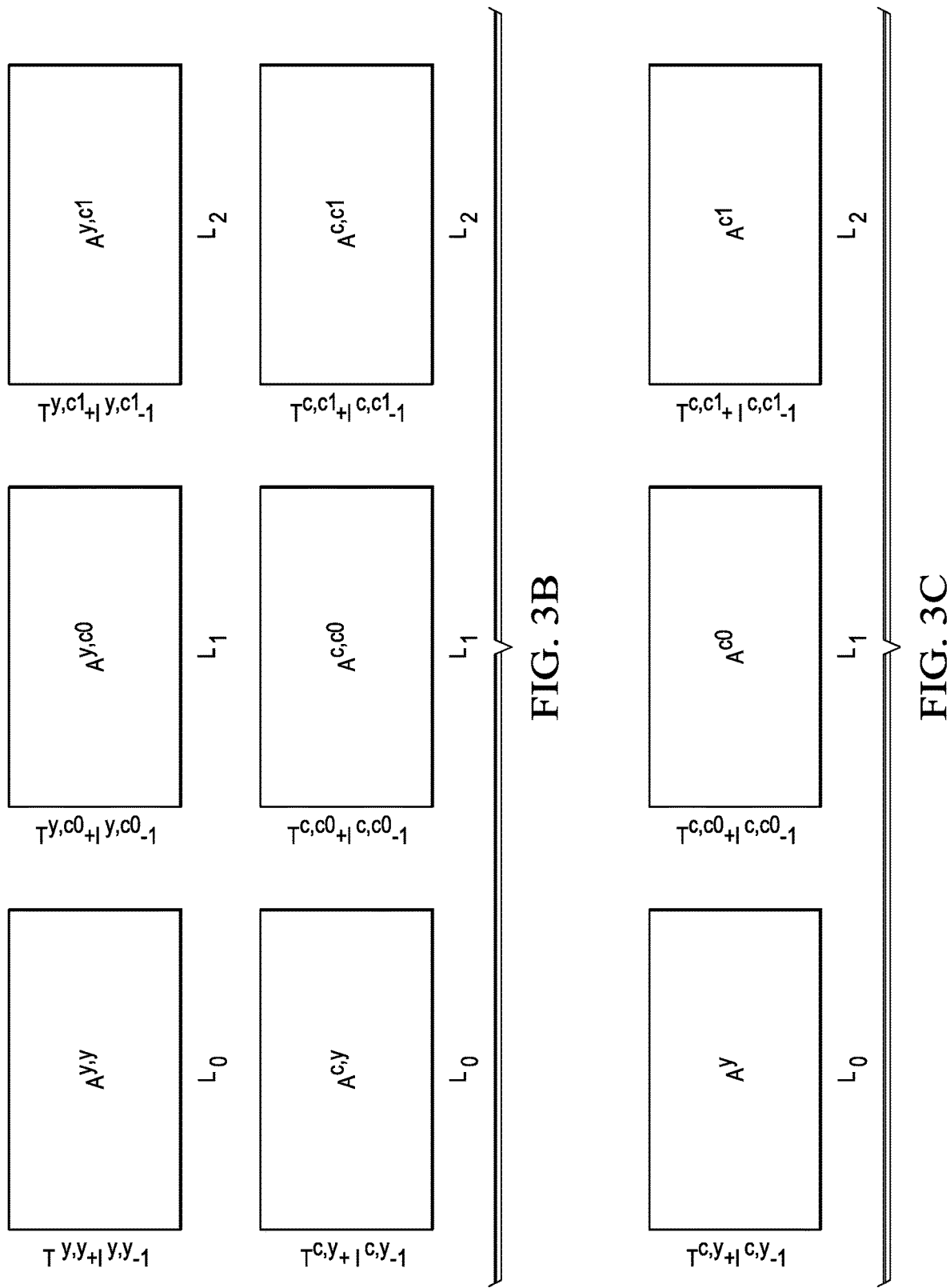

This second scenario can also be indicated through the RPU syntax with basis flags $\psi_{basis}^{y}=0$, $\psi_{basis}^{c0}=0$, $\psi_{basis}^{c1}=1$. Humans are more sensitive to luma changes than chroma variations. Therefore, luma is predicted by a more complex TPB basis function and chroma channels are predicted by simpler functions. The luma channel has different 2D arrays, but the chroma channels can share the same set of 2D arrays. Table 4 shows the 2D arrays used in this scenario and FIG. 3B depicts an example illustration.

TABLE 4

Arrays for storing B-Spline functions for scenario 2

|  | Dimension Y | Dimension C0 | Dimension C1 |
|---|---|---|---|
| Channel Y | $A^{y,y}$ | $A^{y,c0}$ | $A^{y,c1}$ |
| Channel C0/C1 | $A^{c,y}$ | $A^{c,c0}$ | $A^{c,c1}$ |

When the basis flags are $\psi_{basis}^{y}=0$, $\psi_{basis}^{c0}=1$, $\psi_{basis}^{c1}=0$, the second scenario can still be used; however, in practice, this scenario is rather rare and unusual. To estimate the number of B-Spline operations, let us assume that $\Gamma^{y}=\{9,9,9,3,3,3\}$, $\Gamma^{c0}=\{9,9,9,3,3,3\}$ and $\Gamma^{c1}=\{9,9,9,3,3,3\}$. There are 1089 B-Spline operations for each channel. The total number of B-Spline operations in this scenario is 1089×2=2178 for constructing a complete 3DLUT of size 33×33×33.

Scenario 3: Luma and Chroma TPB Parameters are All the Same

In this scenario, the TPB parameter collections for the three channels are all the same, i.e., $\Gamma^{y}=\Gamma^{c0}=\Gamma^{c1}$, as shown in these equations.

$$\{T^{y,y}, T^{y,c0}, T^{y,c1}, l^{y,y}, l^{y,c0}, l^{y,c1}\} = \{T^{c0,y}, T^{c0,c0}, T^{c0,c1}, l^{c0,y}, l^{c0,c0}, l^{c0,c1}\},$$

$$\{T^{y,y}, T^{y,c0}, T^{y,c1}, l^{y,y}, l^{y,c0}, l^{y,c1}\} = \{T^{c1,y}, T^{c1,c0}, T^{c1,c1}, l^{c1,y}, l^{c1,c0}, l^{c1,c1}\},$$

$$\{T^{c0,y}, T^{c0,c0}, T^{c0,c1}, l^{c0,y}, l^{c0,c0}, l^{c0,c1}\} = \{T^{c1,y}, T^{c1,c0}, T^{c1,c1}, l^{c1,y}, l^{c1,c0}, l^{c1,c1}\}.$$

This reduces the amount of metadata transmitted and the computations are faster at the decoder side. This third scenario can also be inferred from the RPU syntax when basis flags are $\psi_{basis}^{y}=0$, $\psi_{basis}^{c0}=1$, $\psi_{basis}^{c1}=1$. All the three channels share the same set of 2D arrays. Table 5 shows the 2D arrays and FIG. 3C provides an example illustration.

TABLE 5

Arrays for storing B-Spline functions for scenario 3

| | Dimension Y | Dimension C0 | Dimension C1 |
|---|---|---|---|
| Channel Y/C0/C1 | $A^y$ | $A^{c0}$ | $A^{c1}$ |

To estimate the number of B-Spline operations, let us assume that $\Gamma^y\{9,9,9,3,3,3\}$, $\Gamma^{c0}=\{9,9,9,3,3,3\}$ and $\Gamma^{c1}=\{9,9,9,3,3,3\}$. There are 1089 B-Spline operations for each channel. The total number of B-Spline operations in this scenario is 1,089 for constructing a complete 3DLUT of size 33×33×33.

In all the above scenarios, the sampling locations can be either uniformly distributed or non-uniformly distributed along the Y, C0 and C1 axes. Similarly, the sampling locations along Y, C0 and C1 axes can be the same (e.g., $s_{ji}^{y}=s_{ji}^{c0}=s_{ji}^{c1}\forall i$) or different (e.g., $s_{ji}^{y}\neq s_{ji}^{c0}\neq s_{ji}^{c1}$). The algorithm will still work as usual. Thus, variations in the sampling locations have no impact on the execution time of the above three scenarios.

There is a possible fourth scenario, where (i) TPB parameters are the same for all the channels (ii) sampling locations are also same for all the axes and (iii) low and high clipping values are same for all the channels too. Then only one 2D array should suffice. But as the clipping values are generally different, this scenario is very rare.

Figure 2B:
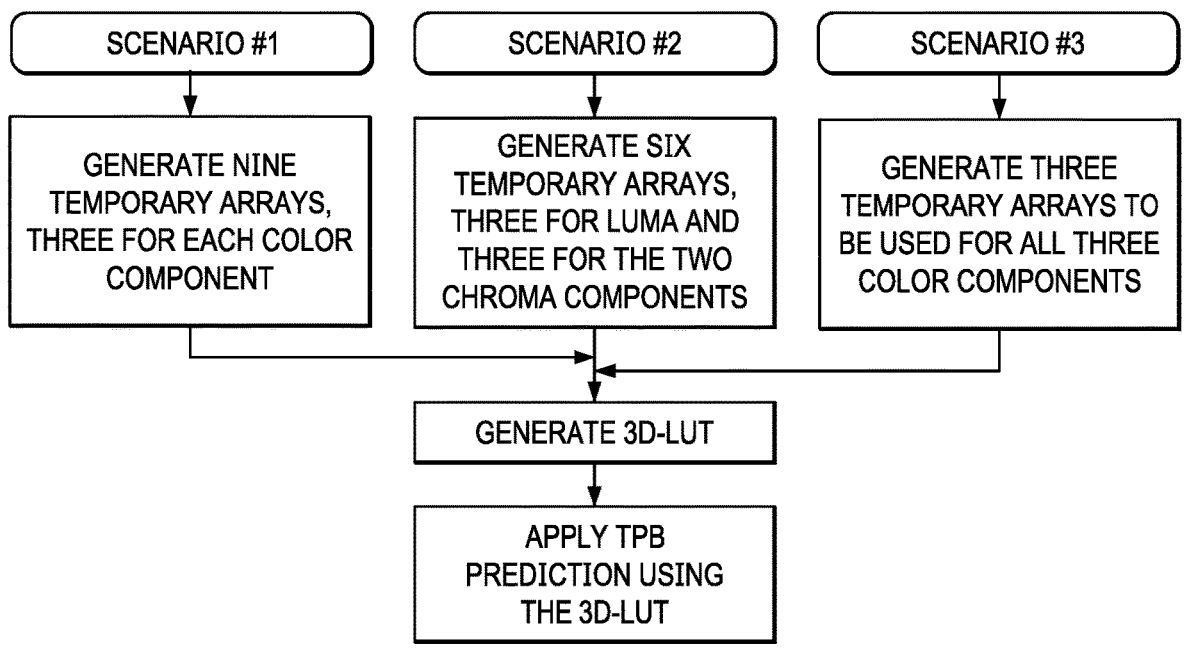

FIG. 2B summarizes the process flow for the three scenarios described earlier. For scenario 1, nine temporary arrays are generated (e.g., see Table 3). Each color component uses a separate set of three of these tables. For scenario 2, six temporary arrays are generated (e.g., see Table 4). Luma uses three of these tables, and both chroma components use the other three. For scenario 3, three temporary arrays are generated (e.g., see Table 5), and the same tables are used to generate the 3D-LUT to predict all color components. Given these temporary tables, a decoder builds a 3D-LUT (see equation (8)), which can be used for SDR-to-HDR prediction as depicted in equations (8) and (15).

Backward-Compatible Mobile Profile

As described earlier, while TPB-based mapping offers improved video quality compared to the traditional prediction (e.g., via piece-wise linear prediction for luma or MMR prediction for chroma), HDR content needs to be played back by both legacy devices (say, HDR TVs on the market) and new devices that support TPB-related metadata.

Figure 4:
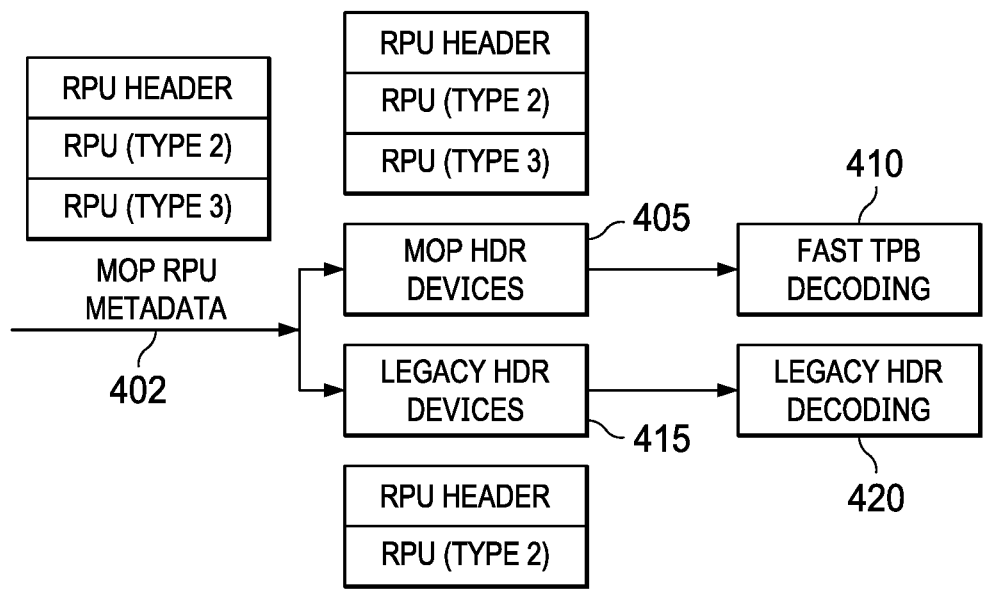
FIG. 4 depicts an example of backward-compatible processing of metadata supporting both legacy and TPB-based prediction according to an embodiment of this invention.

In an embodiment, an extended mapping index in combination with an existing parameter that denotes the bit-depth of an enhancement-layer stream (e.g., as used in legacy Blu-Ray HDR content) is used to point to the usage of TPB prediction parameters. When the bitstream arrives at a new mobile device which supports the new RPU syntax and TPB prediction, the device will use TPB to build a static or dynamic 3D-LUT to reconstruct the HDR. When the bitstream arrives at a legacy device (such as a Dolby Vision TV), the device will use the (static or dynamic) composer to construct HDR images. This way, streams can be backward-compatible but the user experience can be optimized for users with the latest decoders, e.g., mobile users. FIG. 4 depicts an example process of such backward compatibility.

As depicted in FIG. 4, in an example embodiment, metadata for HDR content targeting both legacy devices and the new mobile-optimized profile (MOP) includes metadata within two syntax structures, denoted here as RPU (type 2), for legacy content, and RPU (type 3), for additional TPB-related content. Legacy devices (415) will ignore the RPU (type 3) content and will reconstruct the HDR content using traditional HDR decoding (420). Mobile devices (405) that support RPU (type 3) metadata will use all available metadata to generate a TPB-based 3D-LUT and perform TPB-based decoding (410), with improved quality.

TPB Metadata (RPU (type 3)) Syntax Examples

In an embodiment, TPB prediction may be signaled by using a combination of two syntax elements: EL_bit_depth_minus8 and ext_mapping_idc, with example descriptions as follows:

EL_bit_depth_minus8 is used to derive the bit depth of enhancement layer signal, namely EL_bit_depth, and to derive the extended base layer inverse mapping method indicator, namely ext_mapping_idc. EL_bit_depth=(EL_bit_depth_minus8 & 0xFF)+8.

ext_mapping_idc=(EL_bit_depth_minus8 & 0xFF00)>>8. The value of ((EL_bit_depth_minus8 & 0xFFFF0000)>>16) shall be equal to zero. The value of EL_bit_depth_minus8 shall be in the range of 0 to 4294967295, inclusive.

EL_bit_depth_minus8 is not present when rpu_type is equal to 2 and rpu_format&0x700 is not equal to 0.

The lower 5 bits of ext_mapping_idc is an extended base layer inverse mapping method indicator as defined in Table 7. Other bits of ext_mapping_idc are reserved for future use, for example to identify newer predictors, beyond the capabilities of the TPB predictor described herein.

Note—If ext_mapping_idc & 0x1F is equal to 1, decoder shall take BL signal as-is for reconstructed HDR signal. If the decoder doesn't recognize the ext_mapping_idc field, alternatively, it shall fall back to use the base layer mapping method as indicated by mapping_idc to reconstruct HDR signal.

Note—If ext_mapping_idc & 0x1F is larger than 1 and smaller than 5 or equal to 31, decoder shall fall back to use the base layer mapping method as indicated by mapping_idc to reconstruct HDR signal.

Note—If ext_mapping_idc is larger than 4 and smaller than 31, base layer inverse mapping shall be done using TPB prediction method, if the decoder supports the current TPB prediction type as indicated by ext_mapping_idc. If the decoder doesn't support the current TPB prediction type or doesn't recognize the ext_mapping_idc field at all, alternatively, it shall fall back to use the base layer mapping method as indicated by mapping_idc to reconstruct HDR signal.

Note—If ext_mapping_idc is equal to 5, there shall be a companion RPU with rpu_type=3 to be transmitted immediately after an RPU with rpu_type=2 for the current picture. If the decoder recognizes RPU with rpu_type=3, RPU parser shall extract the custom TPB prediction coefficients and use them in TPB prediction process.

TABLE 6

Example syntax for ext_mapping_idc

| ext_mapping_idc[4:0] | Extended base layer inverse mapping indicator |
|---|---|
| 0 | Follow mapping_idc in base layer prediction |
| 1 | Prefer 1:1 mapping over mapping_idc in base layer prediction |

TABLE 6-continued

Example syntax for ext_mapping_idc

| ext_mapping_idc[4:0] | Extended base layer inverse mapping indicator |
|---|---|
| 2 | Follow mapping_idc in base layer prediction and BL is max 1000 nits, min 0.0001 nits, Rec. BT. 2020 (HDR10) |
| 3-4 | Reserved |
| 5 | Prefer TPB prediction with custom coefficients as defined in vdr_rpu_type3_payload( ) over mapping_idc in base layer prediction |
| 6 | Prefer TPB prediction default mode 0 with pre-stored coefficients and with the following settings over mapping_idc in base layer prediction ext_signal_eotf = 65535 ext_signal_bit_depth = 12 ext_source_min_PQ = 0 ext_source_max_PQ = 3079 |
| 7 . . . 30 | Reserved for additional TPB prediction default modes |
| 31 | Reserved |

To ensure backward compatibility, the mobile optimized profile uses the EL_bit_depth_minus8 field in the existing RPU syntax to signal the 8-bit TPB ext_mapping_idc to the decoders. In EL_bit_depth_minus8, an unsigned 32-bit field encapsulates the ext_mapping_idc and EL_bit_depth_minus8 values in different bit locations as shown in Table 7.

TABLE 7

EL_bit_depth_minus8 parsing

| 31 . . . 24 | 23 . . . 16 | 15 . . . 8 | 7 . . . 0 |
|---|---|---|---|
| Reserved | Reserved | ext_mapping_idc | EL_bit_depth_minus8 |

Thus, for backward compatibility, the LSB 8-bits carry the EL_bit_depth_minus8 value. Legacy devices discard the most significant 24-bits and only parse the lower 8-bits to fetch the value. The next 8-bits from 15 to 8 contain the information that can be interpreted by the devices supporting the latest RPU syntax. The semantics of ext_mapping_idc are shown in Table 6.

If ext_mapping_idc is larger than 4 and smaller than 32, the TPB prediction method is used for base layer inverse mapping, when the decoder supports the current TPB prediction type as indicated by ext_mapping_idc. If the decoder doesn't support the current TPB prediction type or doesn't recognize the ext_mapping_idc field at all, it falls back to use the base layer mapping method as indicated by the mapping_idc syntax variable to reconstruct HDR signal. Without the need to go into details, in an embodiment, the mapping_idc syntax variable is a 16-bit field that specifies a variety of legacy mapping options.

If ext_mapping_idc is equal to 5, then there will be a companion RPU structure with rpu_type=3 to be transmitted immediately after an RPU with rpu_type=2 for the current picture. If the decoder recognizes RPU metadata with rpu_type=3, the RPU parser shall extract the custom TPB prediction coefficients and use them in the TPB prediction process. This process is summarized in FIG. 5.

Figure 5:
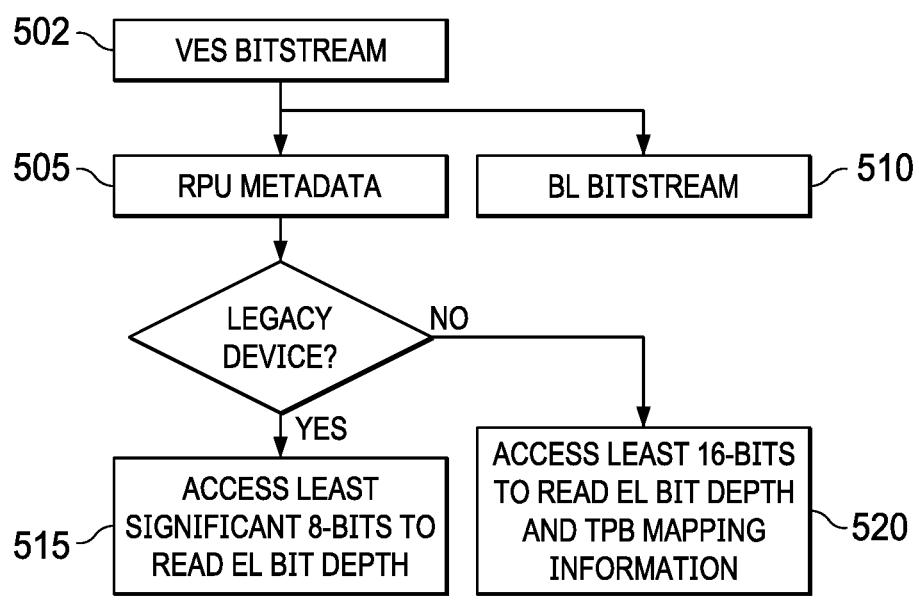
FIG. 5 depicts an example process for parsing a legacy 64-bit parameter field, used to communicate bit-depth information in dual-layer HDR bitstreams, to extract both the bit-depth information and a new syntax parameter for TPB processing according to an embodiment of this invention.

As depicted in FIG. 5, given a video elementary stream (502), a decoder will parse metadata (505, 402) and a base layer (BL) bitstream (510). Looking at the EL_bit_depth_minus8 parameter in the metadata, a legacy device will just extract the 8 least significant bits to read the bit-depth of enhancement-layer data (if any). On the other hand, newer devices will read the least 16 bits and can extract both the bit-depth of the enhancement-layer data (if any) and the value of a new syntax parameter with information related to TPB prediction (e.g., ext_mapping_idc).

Example TPB Payload (RPU (Type 3)) Syntax and Semantics

Section "TPB Cross-color Channel Predictor" describes already the key RPU (type 3) metadata, which includes TPB Parameters, TPB Coefficients, and Auxiliary data. In an embodiment, Table 8 describes an example of the RPU (type 3) payload syntax.

TABLE 8

RPU (Type 3) Example Payload Syntax

| | C | Descriptor |
|---|---|---|
| vdr_rpu_type3_payload( ) { | | |
|   for ( y = 0; y <= num_y_partitions_minus1; y ++ ) { | | |
|     for ( x = 0; x <= num_x_partitions_minus1; x ++ ) { | | |
|       if ( ext_mapping_idc == 5 ) { | | |
|         tpb_coef_data_type[ y ][ x ] | 0 | u(3) |
|         tpb_clipping_flag[ y ][ x ] | 0 | u(1) |
|         for ( cmp = 0; x <= 2; cmp ++ ) { | | |
|           if ( tpb_clipping_flag[ y ][ x ] ) { | | |
|             tpb_clipping_low[ y ][ x ][ cmp ] | 0 | u(10) |
|             tpb_clipping_high[ y ][ x ][ cmp ] | 0 | u(10) |
|           } | | |
|           else { | | |
|             tpb_clipping_low[ y ][ x ][ cmp ] = 0 | | |
|             tpb_clipping_high[ y ][ x ][ cmp ] = 0x3FF | | |
|           } | | |
|           if (cmp > 0 ) | | |
|             tpb_basis_flag[ y ][ x ][ cmp ] | 0 | u(1) |
|           else | | |
|             tpb_basis_flag[ y ][ x ][ cmp ] = 0 | | |
|           if ( tpb_basis_flag[ y ][ x ][ cmp ] == 0 ) { | | |
|             for ( c = 0; c <= 2; c ++ ) { | | |

TABLE 8-continued

RPU (Type 3) Example Payload Syntax

| | C | Descriptor |
|---|---|---|
| tpb_num_knot_minus1[ y ][ x ][ cmp ][ c ] | 0 | ue(v) |
| tpb_order_minus1[ y ][ x ][ cmp ][ c ] | 0 | ue(v) |
| tpb_num_basis[ y ][ x ][ cmp ][ c ] = <br> ( tpb_num_knot_minus1[ y ][ x ][ cmp ][ c ] + <br> tpb_order_minus1[ y ][ x ][ cmp ][ c ] + 1 ) | | |
|     } // three channels | | |
|     for( i = 0; i < tpb_num_basis[ y ][ x ][ cmp ][0]; i ++ ) { | | |
|       for( j = 0; j < tpb_num_basis[ y ][ x ][ cmp ][1]; j ++ ) { | | |
|         for( k = 0; k < tpb_num_basis[ y ][ x ][ cmp ][2]; k ++ ) { | | |
|           tpb_zero_coef[ y ][ x ][ cmp ][ i ][ j ][ k ] | 0 | u(1) |
|           if( tpb_zero_coef[ y ][ x ][ cmp ][ i ][ j ][ k ] == 0 ) | | |
|             tpb_coef[ y ][ x ][ cmp ][ i ][ j ][ k ] | 0 | u(v) |
|           else | | |
|             tpb_coef[ y ][ x ][ cmp ][ i ][ j ][ k ] = 0 | | |
|         } // for the third channel | | |
|       } // for the second channel | | |
|     } // for the first channel | | |
|   } // tpb_basis_flag[ y ][ x ][ cmp ] == 0 | | |
|   else { | | |
|     for ( c = 0; c <= 2; c ++ ) { | | |
|       tpb_num_knot_minus1[ y ][ x ][ cmp ][ c ] = <br> tpb_num_knot_minus1[ y ][ x ][ cmp - 1 ][ c ] | | |
|       tpb_order_minus1 [ y ][ x ][ cmp ][ c ] = <br> tpb_order_minus1[ y ][ x ][ cmp - 1 ][ c ] | | |
|       tpb_num_basis [ y ][ x ][ cmp ][ c ] = tpb_num_basis[ y ][ x ][ cmp - 1 ][ c ] | | |
|     } // three channels | | |
|     for( i = 0; i < tpb_num_basis[ y ][ x ][ cmp ][0]; i ++ ) { | | |
|       for( j = 0; j < tpb_num_basis[ y ][ x ][ cmp ][1]; j ++ ) { | | |
|         for( k = 0; k < tpb_num_basis[ y ][ x ][ cmp ][2]; k ++ ) { | | |
|           tpb_zero_coef[ y ][ x ][ cmp ][ i ][ j ][ k ] = <br> tpb_zero_coef[ y ][ x ][ cmp - 1 ][ i ][ j ][ k ] | | |
|           if( tpb_zero_coef[ y ][ x ][ cmp ][ i ][ j ][ k ] == 0 ) | | |
|             tpb_coef[ y ][ x ][ cmp ][ i ][ j ][ k ] | 0 | u(v) |
|           else | | |
|             tpb_coef[ y ][ x ][ cmp ][ i ][ j ][ k ] = 0 | | |
|         } // for the third channel | | |
|       } // for the second channel | | |
|     } // for the first channel | | |
|   } // tpb_basis_flag[ y ][ x ][ cmp ] == 1 | | |
| } // cmp | | |
| } // TPB custom coefficients | | |
| } // x | | |
| } // y | | |
| ext_mapping_preferred_L0_present_flag | 0 | u(1) |
| if ( ext_mapping_preferred_L0_present_flag ) { | | |
|   ext_signal_eotf | 0 | u(16) |
|   if (ext_signal_eotf >= 36045 && ext_signal_eotf <= 45875 ) { | | |
|     ext_signal_eotf_param0 | 0 | u(16) |
|     ext_signal_eotf_param1 | 0 | u(16) |
|     ext_signal_eotf_param2 | 0 | u(32) |
|   } // Gamma parameters | | |
|   ext_signal_bit_depth | 0 | u(5) |
|   ext_source_min_PQ | 0 | u(12) |
|   ext_source_max_PQ | 0 | u(12) |
| } // DM L0 metadata preferred by extended inverse mapping | | |
| } | | |

The semantics of RPU data payload for rpu_type equal to 3 are defined below.

tpb_coef_data_type[y][x] specifies the length of non-zero TPB coefficients used for the partition with vertical coordinate y and horizontal coordinate x. The data types are defined as below.

| tpb_coef_data_type | Definition of TPB Coefficients Data Type |
|---|---|
| 0 | 10-bit floating point (sign = 1-bit, exponent = 3 bit, mantissa = 6-bit) |
| 1 | 12-bit floating point (sign = 1-bit, exponent = 4 bit, mantissa = 7-bit) |
| 2 | 14-bit floating point (sign = 1-bit, exponent = 5 bit, mantissa = 8-bit) |
| 3 | 16-bit floating point (sign = 1-bit, exponent = 5 bit, mantissa = 10-bit) |
| 4 . . . 7 | Reserved | tpb_clipping_flag[y][x] equal to 1 indicates the lower and upper bound of clipping thresholds for input signal used for the partition with vertical coordinate y and horizontal coordinate x are present.

tpb_clipping_low[y][x][cmp] specifies the lower bound of 10-bit clipping threshold for input signal used for the partition with vertical coordinate y and horizontal coordinate x and the color component cmp. If tpb_clipping_low[y][x][cmp] is not present, it shall be inferred to be 0.

tpb_clipping_high[y][x][cmp] specifies the upper bound of 10-bit clipping threshold for input signal used for the partition with vertical coordinate y and horizontal coordinate x and the color component cmp. If tpb_clipping_high[y][x][cmp] is not present, it shall be inferred to be 0x3FF.

tpb_basis_flag[y][x][cmp] equal to 1 indicates the basis function used for the partition with vertical coordinate y and horizontal coordinate x and the color component cmp is identical to the basis function for the partition with vertical coordinate y and horizontal coordinate x and the color component (cmp−1). If tpb_basis_flag[y][x][cmp] is not present, it shall be inferred to be 0.

tpb_num_knot_minus1[y][x][cmp][c] specifies the number of TPB knots minus 1 used for the partition with vertical coordinate y and horizontal coordinate x, the color component cmp, and in channel c. If tpb_num_knot_minus1[y][x][cmp][c] is not present, it shall be inferred to be the value of tpb_num_knot_minus1[y][x][cmp−1][c].

tpb_order_minus1[y][x][cmp][c] specifies the order of TPB prediction minus 1 used for the partition with vertical coordinate y and horizontal coordinate x, the color component cmp, and in channel c. If tpb_order_minus1[y][x][cmp][c] is not present, it shall be inferred to be the value of tpb_order_minus1[y][x][cmp−1][c].

tpb_zero_coef[y][x][cmp][i][j][k] equal to 1 indicates the coefficient used for the partition with vertical coordinate y and horizontal coordinate x, the color component cmp, at the i-th knot of channel 0 and the j-th knot of channel 1 and the k-th knot of channel 2 is zero. If tpb_zero_coef[y][x][cmp][i][j][k] is not present, it shall be inferred to be the value of tpb_zero_coef[y][x][cmp−1][i][j][k].

tpb_coef[y][x][cmp][i][j][k] specifies the non-zero TPB coefficient used for the partition with vertical coordinate y and horizontal coordinate x, the color component cmp, at the i-th knot of channel 0 and the j-th knot of channel 1 and the k-th knot of channel 2. The length of the tpb_coef[y][x][cmp][i][j][k] syntax element is derived from tpb_coef_data_type[y][x]. If tpb_coef[y][x][cmp][i][j][k] is not present, it shall be inferred to be 0.

Note: tpb_zero_coeff is an indicator of whether a corresponding TPB coefficient is zero. It has been observed that there are a lot of TPB coefficients having value 0. Instead of signaling those coefficients as "0" using half floats, one can use this 1-bit indicator to reduce the overhead. Of course, one still needs to include the non-zero TPB coefficient in the metadata.

ext_mapping_preferred_L0_present_flag equal to 1 indicates that the preferred alternative values for the signal_eotf syntax element, the signal_eotf_param0 syntax element, the signal_eotf_param1 syntax element, the signal_eotf_param2 syntax element and the signal_bit_depth syntax element of HDR Display Management signal representation metadata are present in the current HDR RPU with rpu_type=3. If ext_mapping_preferred_L0_present_flag is not present, it shall be inferred to be 0.

ext_signal_eotf specifies a preferred alternative value for the signal_eotf syntax element of the DM signal representation metadata. The semantics for ext_signal_eotf are the same as for the signal_eotf syntax element specified in HDR Display Management metadata. When ext_signal_eotf is not equal to the value of signal_eotf indicated in HDR Display Management metadata and decoder supports the extended base layer inverse mapping method indicated by ext_mapping_idc, decoder shall ignore the value of signal_eotf indicated in HDR Display Management metadata and instead use the value indicated by ext_signal_eotf.

ext_signal_eotf_param0 specifies a preferred alternative value for the signal_eotf_param0 syntax element of the DM signal representation metadata. The semantics for ext_signal_eotf_param0 are the same as for the signal_eotf_param0 syntax element specified in HDR Display Management metadata. When ext_signal_eotf_param0 is not equal to the value of signal_eotf_param0 indicated in HDR Display Management metadata and decoder supports the extended base layer inverse mapping method indicated by ext_mapping_idc, decoder shall ignore the value of signal_eotf_param0 indicated in HDR Display Management metadata and instead use the value indicated by ext_signal_eotf_param0.

ext_signal_eotf_param1 specifies a preferred alternative value for the signal_eotf_param1 syntax element of the DM signal representation metadata. The semantics for ext_signal_eotf_param1 are the same as for the signal_eotf_param1 syntax element specified in HDR Display Management metadata. When ext_signal_eotf_param1 is not equal to the value of signal_eotf_param1 indicated in HDR Display Management metadata and decoder supports the extended base layer inverse mapping method indicated by ext_mapping_idc, decoder shall ignore the value of signal_eotf_param1 indicated in HDR Display Management metadata and instead use the value indicated by ext_signal_eotf_param1.

ext_signal_eotf_param2 specifies a preferred alternative value for the signal_eotf_param2 syntax element of the DM signal representation metadata. The semantics for ext_signal_eotf_param2 are the same as for the signal_eotf_param2 syntax element specified in HDR Display Management metadata. When ext_signal_eotf_param2 is not equal to the value of signal_eotf_param2 indicated in HDR Display Management metadata and decoder supports the extended base layer inverse mapping method indicated by ext_mapping_idc, decoder shall ignore the value of signal_eotf_param2 indicated in HDR Display Management metadata and instead use the value indicated by ext_signal_eotf_param2.

ext_signal_bit_depth specifies a preferred alternative value for the signal_bit_depth syntax element of the DM signal representation metadata. The semantics for ext_signal_bit_depth are the same as for the signal_bit_depth syntax element specified in HDR Display Management metadata. When ext_signal_bit_depth is not equal to the value of signal_bit_depth indicated in HDR Display Management metadata and decoder supports the extended base layer inverse mapping method indicated by ext_mapping_idc, decoder shall ignore the value of signal_bit_depth indicated in HDR Display Management metadata and instead use the value indicated by ext_signal_bit_depth.

ext_source_min_PQ specifies a preferred alternative value for the source_min_PQ syntax element of the DM signal representation metadata. The semantics for ext_source_min_PQ are the same as for the source_min_PQ syntax element specified in HDR Display Management metadata. When ext_source_min_PQ is not equal to the value of source_min_PQ indicated in HDR Display Management metadata and decoder supports the extended base layer inverse mapping method indicated by ext_mapping_idc, decoder shall ignore the value of source_min_PQ indicated in HDR Display Management metadata and instead use the value indicated by ext_source_min_PQ.

ext_source_max_PQ specifies a preferred alternative value for the source_max_PQ syntax element of the DM signal representation metadata. The semantics for ext_source_max_PQ are the same as for the source_max_PQ syntax element specified in HDR Display Management metadata. When ext_source_max_PQ is not equal to the value of source_max_PQ indicated in HDR Display Management metadata and decoder supports the extended base layer inverse mapping method indicated by ext_mapping_idc, decoder shall ignore the value of source_max_PQ indicated in HDR Display Management metadata and instead use the value indicated by ext_source_max_PQ.

While example embodiments are provided for mobile applications, a persons skilled in the art would appreciate that the proposed methods and systems are applicable to non-mobile devices as well, such as set-top boxes, television sets, computers, gaming consoles, and other devices for the play-pack of video content.

REFERENCES

Each of these references is incorporated herein by reference in its entirety.
1. G-M. Su and H. Kadu, "*Image prediction for HDR imaging in open-loop codecs*," PCT Application Ser. No. PCT/US2021/038258, filed on Jun. 21, 2021.
2. G-M. Su et al., "*Multiple color channel multiple regression predictor*," U.S. Pat. No. 8,811,490.
3. G-M Su et al., "*Tensor-product B-Spline predictor*," PCT Application Ser. No. PCT/US2020/053172, filed on Sep. 29, 2020, published as WO/2021/067204 on Apr. 8, 2021.
4. L. Fahrmeir, T. Kneib, S. Lang, and B. Marx, "Regression; models, methods, and applications," pp. 418, Springer, 2013.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to image prediction techniques, such as those described herein. The computer and/or IC may compute, any of a variety of parameters or values that relate to the generation of image prediction techniques as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for image prediction techniques as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to image prediction techniques are thus described. In the foregoing specification, embodiments of the present invention have been described with reference to numerous specific details that may vary from implementation to implementation. Thus, the sole and exclusive indicator of what is the invention and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE1. A method for decoding high-dynamic range video data, the method comprising:
receiving an input image encoded in an input dynamic range;
receiving metadata for the input image to generate a mapping function to map the input image from the input dynamic range to an output image in an output dynamic range;

parsing a first metadata parameter to identify whether a second metadata parameter is present;
  if the second metadata parameter is present, then
    generating the mapping function using a tensor-product B-spline (TPB) predictor;
  else generating the mapping function using a legacy predictor; and
applying the mapping function to the input image to generate the output image.

EEE2. The method of EEE 1, wherein the input dynamic range comprises a standard dynamic range and the output dynamic range comprises a high dynamic range.

EEE3. The method of EEE 1 or EEE 2, wherein the first metadata parameter comprises a parameter for determining bit depth in an enhancement layer of the input image.

EEE4. The method of any of EEEs 1-3, wherein identifying whether the second metadata parameter is present comprises:
  masking the first metadata parameter to read two separate values, a first value based on bits 0-7 of the first metadata parameter and a second value based on bits 8-15 of the first metadata parameter; and
  identifying whether the second metadata parameter is present based on the second value.

EEE5. The method of any of EEEs 1-4, wherein generating the mapping function using a tensor-product B-spline (TPB) predictor comprises:
  accessing TPB metadata within the metadata of the input image, wherein the TPB metadata define TBP-related prediction parameters; and
  generating based on the TPB metadata a three dimensional look up table (3D-LUT) to map selected triplets of pixel values in the input dynamic range to corresponding output triplets in the output dynamic range.

EEE6. The method of EEE 5, wherein the TPB metadata comprise:
  a number of knot points (T) in each of three dimensions of a luma channel and two chroma channels;
  polynomial order (l) values in each of three dimensions of the luma channel and the two chroma channels;
  prediction coefficients for the luma channel and the two chroma channels; and
  a luma-channel basis flag and two chroma-channel basis flags for determining correlation among the prediction coefficients for the luma channel and the two chroma channels.

EEE7. The method of EEE 6, wherein generating the 3D-LUT further comprises:
  if all basis flags are 0, then:
    generate nine temporary arrays, three for each color channel;
  else if the luma-channel basis flag is 0 and one of the two chroma-channel basis flags is 1, then:
    generate three temporary arrays for the luma channel and three temporary arrays for the two chroma channels;
  else if the luma-channel basis flag is 0 and both of the two chroma-channel basis flags are 1, then:
    generate three temporary arrays to be used for all color channels; and generate the 3D-LUT for each color channel based on a product of the three temporary arrays for that color channel.

EEE8. A non-transitory computer-readable storage medium having stored thereon computer-executable instructions for executing with one or more processors a method in accordance with any one of the EEEs 1-7.

EEE9. An apparatus comprising a processor and configured to perform any of the methods recited in EEEs 1-7.

The invention claimed is:

1. A method for decoding high-dynamic range images and video, the method comprising:
  receiving an input image represented in an input dynamic range;
  receiving metadata for the input image to generate a mapping function to map the input image from the input dynamic range to an output image in an output dynamic range;
  parsing a first metadata parameter to identify whether a second metadata parameter is present;
    if the second metadata parameter is present, then
      generating the mapping function using a non-backward compatible predictor, wherein the non-backward compatible predictor comprises a tensor-product B-spline (TPB) predictor, wherein generating the mapping function using a tensor-product B-spline (TPB) predictor comprises:
        accessing TPB metadata within the metadata of the input image, wherein the TPB metadata comprise TPB-related prediction parameters, prediction coefficients, and auxiliary data; and
        generating based on the TPB metadata a three dimensional look up table (3D-LUT) to map selected triplets of pixel values in the input dynamic range to corresponding output triplets of pixel values in the output dynamic range,
      wherein generating the 3D-LUT involves, for each 3D-LUT index, generating respective basis functions by using the prediction parameters and computing a respective output pixel value by using the prediction coefficients based on the basis functions;
      wherein generating the 3D-LUT involves first storing frequently used values of the basis functions in one or more 2D arrays for later computing output pixel values by using the prediction coefficients;
      wherein the prediction parameters comprise:
        a number of knot points (T) in each of three dimensions of a luma channel and two chroma channels; and
        polynomial order (l) values in each of the three dimensions of the luma channel and the two chroma channels;
      wherein the prediction coefficients comprise:
        prediction coefficients for the luma channel and the two chroma channels; and
      wherein the auxiliary data comprise:
        a luma-channel basis flag and two chroma-channel basis flags for determining correlation among the prediction coefficients for the luma channel and the two chroma channels;
    else generating the mapping function using a backward-compatible predictor supported by legacy devices; and
  applying the mapping function to the input image to generate the output image,
  wherein the input dynamic range comprises a standard dynamic range and the output dynamic range comprises a high dynamic range.

2. The method of claim 1, wherein the first metadata parameter comprises a parameter for determining bit depth information in an enhancement layer of the input image.

3. The method of claim 1, wherein identifying whether the second metadata parameter is present comprises:
   masking the first metadata parameter to read two separate values, a first value based on bits 0-7 of the first metadata parameter and a second value based on bits 8-15 of the first metadata parameter; and
   identifying whether the second metadata parameter is present based on the second value.

4. The method of claim 1, wherein generating the 3D-LUT further comprises:
   if all basis flags are 0, then:
      generating nine temporary arrays, three temporary arrays for each color channel;
   else if the luma-channel basis flag is 0 and one of the two chroma-channel basis flags is 1, then:
      generating three temporary arrays for the luma channel and three temporary arrays for the two chroma channels;
   else if the luma-channel basis flag is 0 and both of the two chroma-channel basis flags are 1, then:
      generating three temporary arrays to be used for all color channels; and
   generating the 3D-LUT for each color channel based on a product of the three temporary arrays for that color channel.

5. The method of claim 4, wherein generating three temporary arrays for the luma color channel comprises computing arrays $A^{y,y}(s_{ji}^y, k_p^{y,y})$, $A^{y,c0}(s_{ji}^{c0}, k_q^{y,c0})$ and $A^{y,c1}(s_{ji}^{c1}, k_q^{y,c1})$, wherein for an $L_0 \times L_1 \times L_2$ 3D-LUT:
   $A^{y,y}(s_{ji}^y, k_p^{y,y})$ denotes $(T^{y,y}+l^{y,y}-1) \times L_0$ values of a $B_{j,q}^{y,0}(s_{ji}^y, k_p^{y,y}, h^{y,y}, l^{y,y})$ B-spline function for input luma pixel values $s_{ji}^y$, for i=0, 1, . . . , $L_0$, at uniformly distributed knot points $k_p^{y,y}$ at distance $h^{y,y}$, order $l^{y,y}$, and a total of $T^{y,y}$ $k_p^{y,y}$ knot points;
   $A^{y,c0}(s_{ji}^{c0}, k_q^{y,c0})$ denotes $(T^{y,c0}+l^{y,c0}-1) \times L_1$ values of a $B_{j,q}^{y,1}(s_{ji}^{c0}, k_q^{y,c0}, h^{y,c0}, l^{y,c0})$ B-Spline function for input C0 chroma pixel values $s_{ji}^y$, for i=0, 1, . . . , $L_1$, at uniformly distributed knot points $k_p^{y,c0}$ at distance $h^{y,c0}$, order $l^{y,c0}$, and $T^{y,c0}$ total $k_p^{y,c0}$ knot points; and
   $A^{y,c1}(s_{ji}^{c1}, k_q^{y,c1})$ denotes $(T^{y,c1}+l^{y,c1}-1) \times L_2$ values of a $B_{j,r}^{y,2}(s_{ji}^{c1}, k_r^{y,c1}, h^{y,c1}, l^{y,c1})$ B-Spline function for input C1 chroma pixel values $s_{ji}^{c1}$, for i=0, 1, . . . , $L_2$, at uniformly distributed knot points $k_p^{y,c1}$ at distance $h^{y,c1}$, order $l^{y,c1}$, and $T^{y,c1}$ total $k_p^{y,c1}$ knot points.

6. The method of claim 5, wherein generating luma output values in the 3D-LUT further comprises computing $$B_{j,t}^{TPB,y}(s_{ji}^y, s_{ji}^{c0}, s_{ji}^{c1}, k_p^{y,y}, k_q^{y,c0}, h^{y,y}, h^{y,c0}, h^{y,c1}, l^{y,y}, l^{y,c0}, l^{y,c1}) = A^{y,y}(s_{ji}^y, k_p^{y,y}) \cdot A^{y,c0}(s_{ji}^{c0}, k_q^{y,c0}) \cdot A^{y,c1}(s_{ji}^{c1}, k_q^{y,c1});$$ and predicting the output values $\hat{v}_{ji}^y$ in the output dynamic range as $$\hat{v}_{ji}^y = \Sigma_{t=0}^{D^y-1} m_{j,t}^{TPB,y} \cdot$$

$$B_{j,t}^{TPB,y}(s_{ji}^y, s_{ji}^{c0}, s_{ji}^{c1}, k_p^{y,y}, k_q^{y,c0}, k_r^{y,c1}, h^{y,y}, h^{y,c0}, h^{y,c1}, l^{y,y}, l^{y,c0}, l^{y,c1}),$$

wherein
$D^y = (T^{y,y}+l^{y,y}-1) \times (T^{y,c0}+l^{y,c0}-1) \times (T^{y,c1}+l^{y,c1}-1)$, and $m_{j,t}^{TPB,y}$ denote the prediction coefficients.

7. The method of claim 5, wherein computing output points for a B-spline function of the form $B_t(x, k_t, h, l)$, wherein x denotes input pixel values, $k_t$ denotes uniformly distributed knot points with distance h, and l denotes its order, $$B_t(x, k_t, h, l) = \begin{cases} B_t^1(x, k_t, h) & \text{for } l = 1 \\ B_t^2(x, k_t, h) & \text{for } l = 2 \\ B_t^3(x, k_t, h) & \text{for } l = 3 \end{cases}$$

wherein for an l-th order truncated polynomial defined as $$(x-a)_+^l = \begin{cases} (x-a)^l & x \geq a \\ 0 & x < a \end{cases}$$

$$B_t^1(x, k_t, h) = \left(\frac{1}{h}\right)[(x-k_{t-1})_+ - 2(x-k_t)_+ + (x-k_{t+1})_+],$$

$$B_t^2(x, k_t, h) = \frac{1}{2}\left(\frac{1}{h}\right)^2 [(x-k_{t-1})_+^2 - 3(x-k_t)_+^2 + 3(x-k_{t+1})_+^2 - (x-k_{t+2})_+^2],$$

and $$B_t^3(x, k_t, h) = \frac{1}{6}\left(\frac{1}{h}\right)^3 [(x-k_{t-2})_+^3 - 4(x-k_{t-1})_+^3 + 6(x-k_t)_+^3 - 4(x-k_{t+1})_+^3 + (x-k_{t+2})_+^3].$$

8. The method of claim 7, wherein $B_t(x, k_t, h, l)$ is computed for Nx values that are uniformly distributed within the input dynamic range.

9. The method of claim 7, wherein $B_t(x, k_t, h, l)$ is computed for Nx values that are non-uniformly distributed within the input dynamic range.

10. A non-transitory computer-readable storage medium having stored thereon computer-executable instructions for executing with one or more processors a method in accordance with claim 1.

11. An apparatus comprising a processor and configured to perform the methods recited in claim 1.

\* \* \* \* \*